(12) United States Patent
Arai

(10) Patent No.: US 9,019,622 B2
(45) Date of Patent: Apr. 28, 2015

(54) ZOOM LENS, OPTICAL APPARATUS, AND METHOD FOR MANUFACTURING ZOOM LENS

(71) Applicant: Nikon Corporation, Tokyo (JP)

(72) Inventor: Daisaku Arai, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/001,777

(22) PCT Filed: Nov. 2, 2012

(86) PCT No.: PCT/JP2012/007034
§ 371 (c)(1),
(2) Date: Oct. 25, 2013

(87) PCT Pub. No.: WO2013/111221
PCT Pub. Date: Aug. 1, 2013

(65) Prior Publication Data
US 2014/0055869 A1    Feb. 27, 2014

Related U.S. Application Data

(60) Provisional application No. 61/703,707, filed on Sep. 20, 2012.

(30) Foreign Application Priority Data

Jan. 25, 2012 (JP) .................. 2012-013567

(51) Int. Cl.
*G02B 15/14* (2006.01)
*G02B 3/02* (2006.01)
*G02B 13/18* (2006.01)
*G02B 9/34* (2006.01)
*G02B 15/173* (2006.01)

(52) U.S. Cl.
CPC .............. *G02B 15/14* (2013.01); *G02B 15/173* (2013.01); *Y10T 29/49826* (2015.01)

(58) Field of Classification Search
USPC .......................... 359/683–687, 715, 740, 774
See application file for complete search history.

(56) References Cited

U.S. PATENT DOCUMENTS

| 7,852,567 B1 | 12/2010 | Kanazashi | |
| 2010/0296173 A1* | 11/2010 | Kanazashi | 359/687 |
| 2012/0002299 A1* | 1/2012 | Kato | 359/687 |

FOREIGN PATENT DOCUMENTS

| JP | 2004-077801 A | 3/2004 |
| JP | 2010-160242 A | 7/2010 |

(Continued)

OTHER PUBLICATIONS

International Search Report from International Patent Application No. PCT/JP2012/007034, Feb. 5, 2013.

*Primary Examiner* — Evelyn A. Lester
(74) *Attorney, Agent, or Firm* — Miles & Stockbridge P.C.

(57) ABSTRACT

Provided is a zoom lens, including, in order from an object: a first lens group (G1) having positive refractive power; a second lens group (G2) having negative refractive power; a third lens group (G3) having positive refractive power; and a fourth lens group (G4) having positive refractive power. The first lens group (G1 includes only, in order from the object, a cemented lens of a negative lens (L11) and a positive lens (L12), and a positive meniscus lens (L13) having a convex surface facing the object, an aperture stop (S) for determining brightness is disposed to the object side of the third lens group (G3), and upon zooming, all of the four groups (G1 to G4) move and the aperture stop (S) moves together with the third lens group (G3), and the conditional expression vdp1>85.0 is satisfied, where vdp1 denotes an Abbe number of the positive lens (L12), which is disposed closest to the object in the first lens group (G1), at the d-line as a standard.

11 Claims, 23 Drawing Sheets

(56) References Cited

FOREIGN PATENT DOCUMENTS

| | | |
|---|---|---|
| JP | 2010-271468 A | 12/2010 |
| JP | 2011-186159 A | 9/2011 |
| JP | 2011-186165 A | 9/2011 |

\* cited by examiner

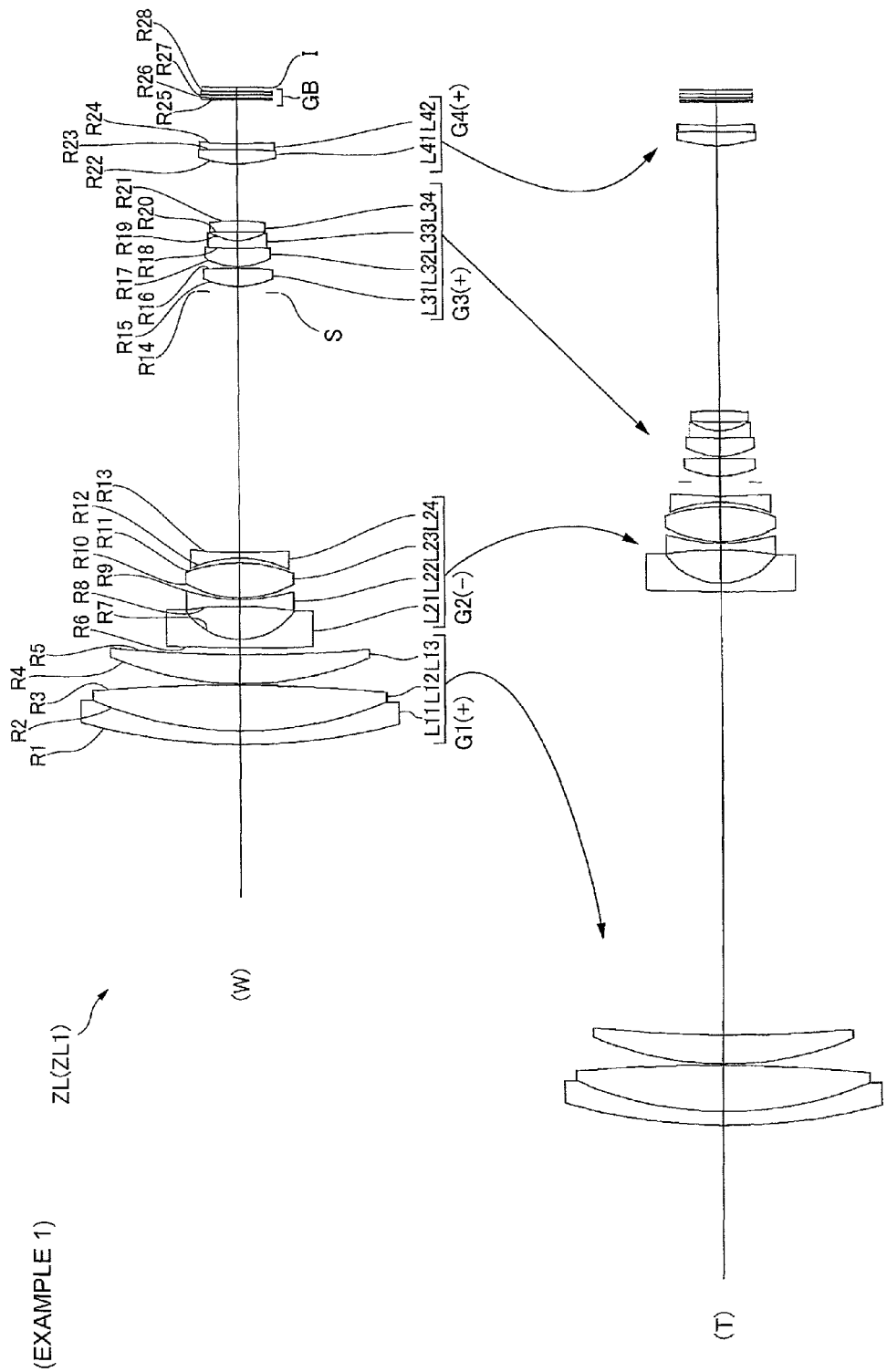

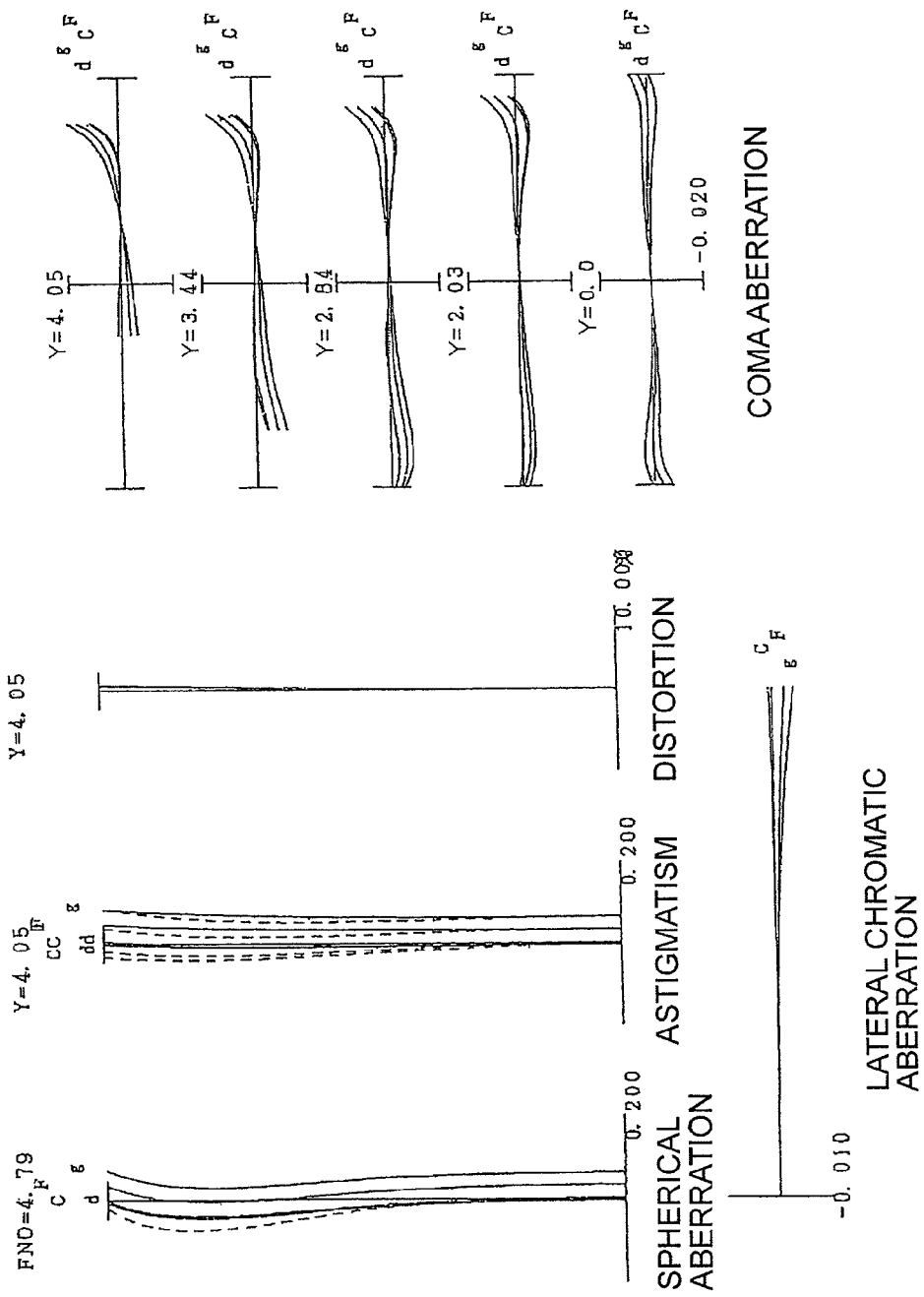

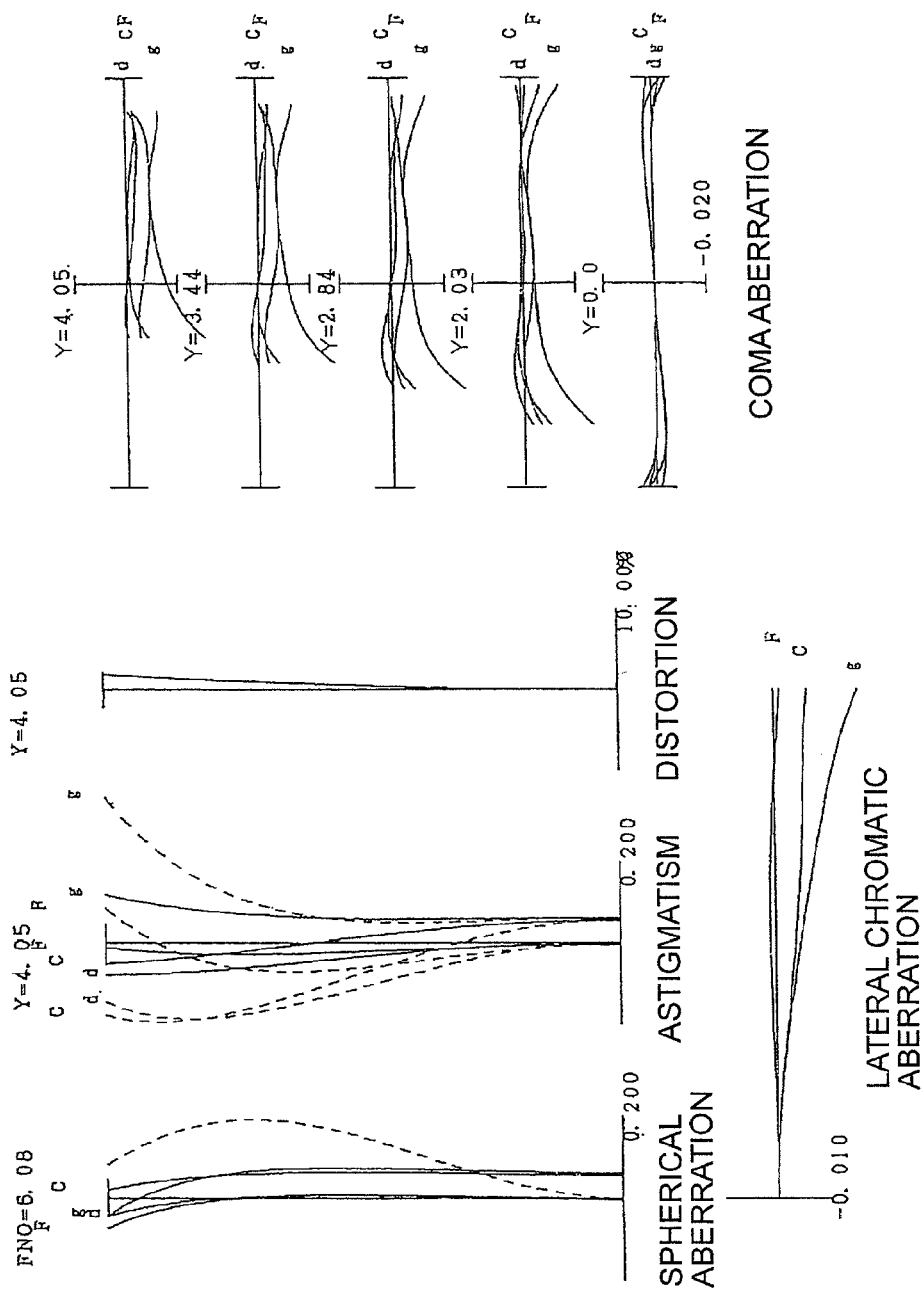

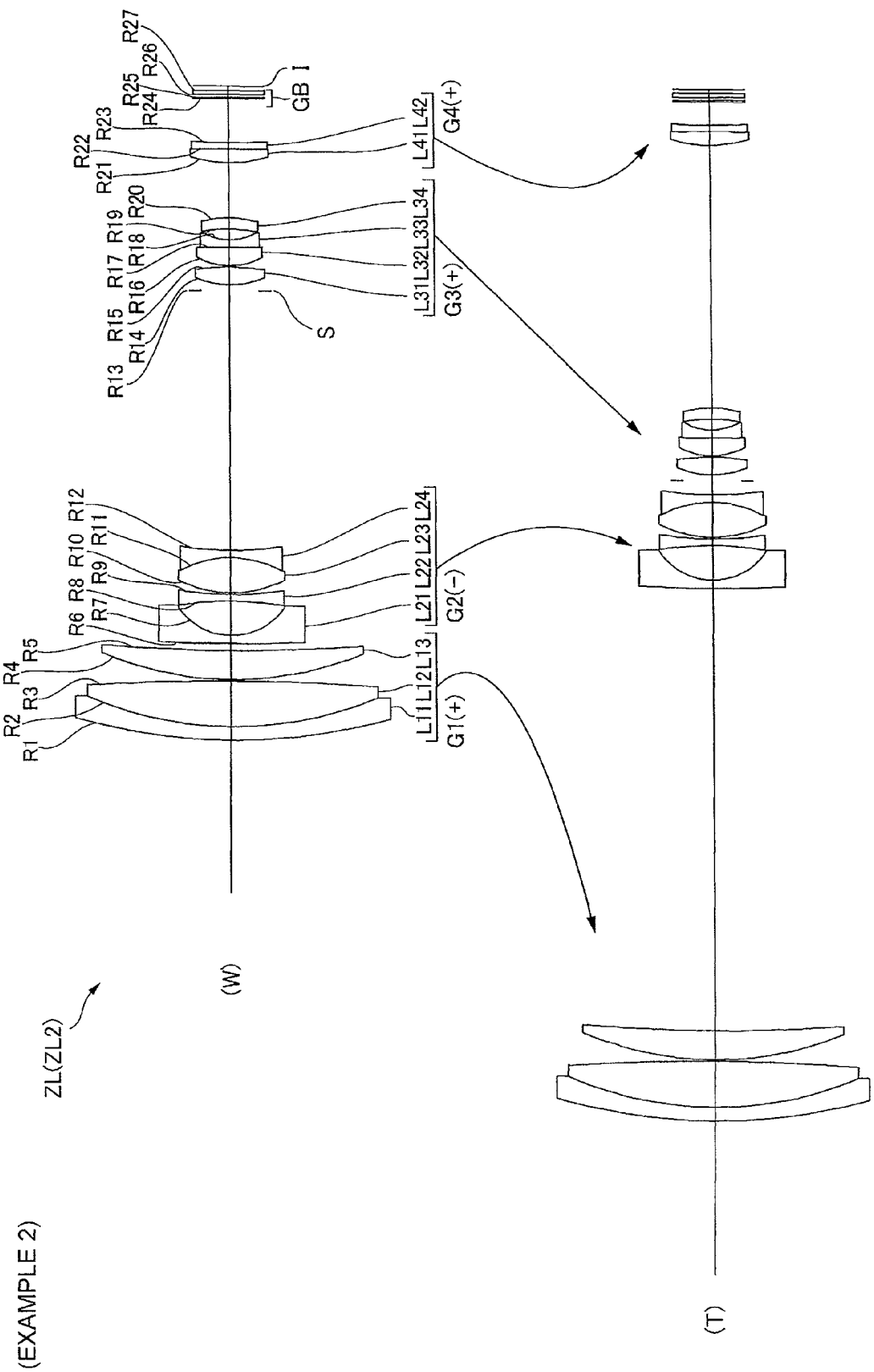

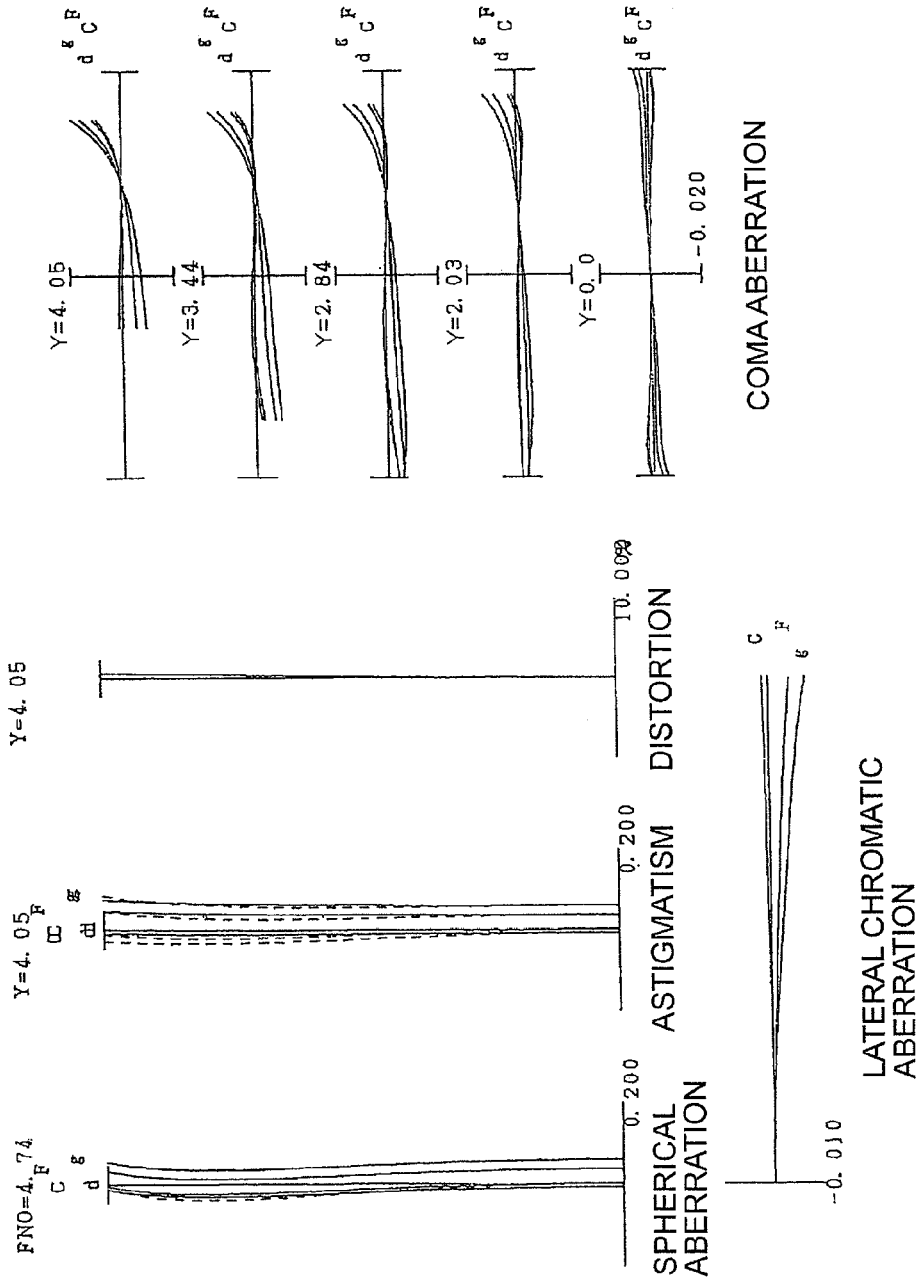

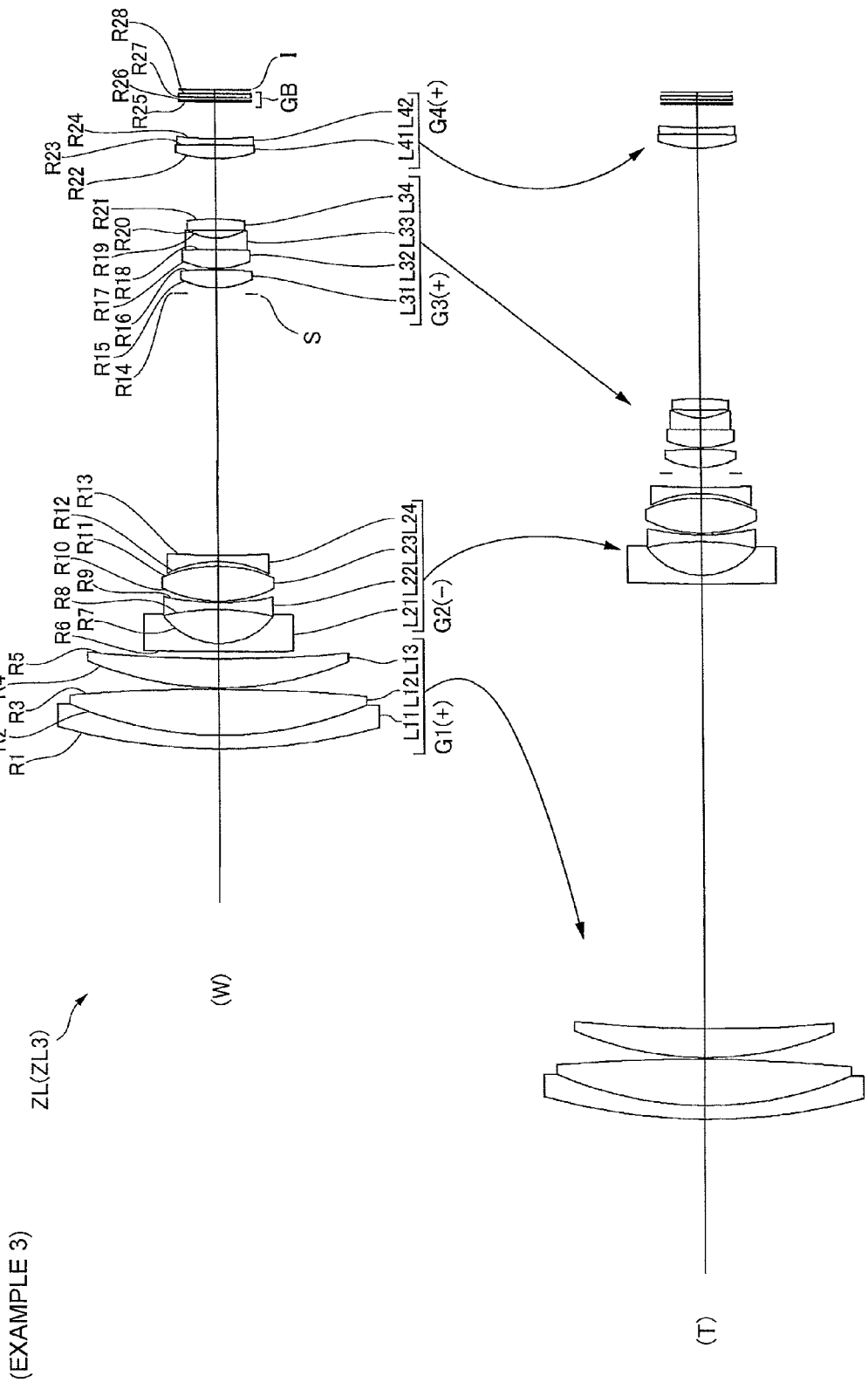

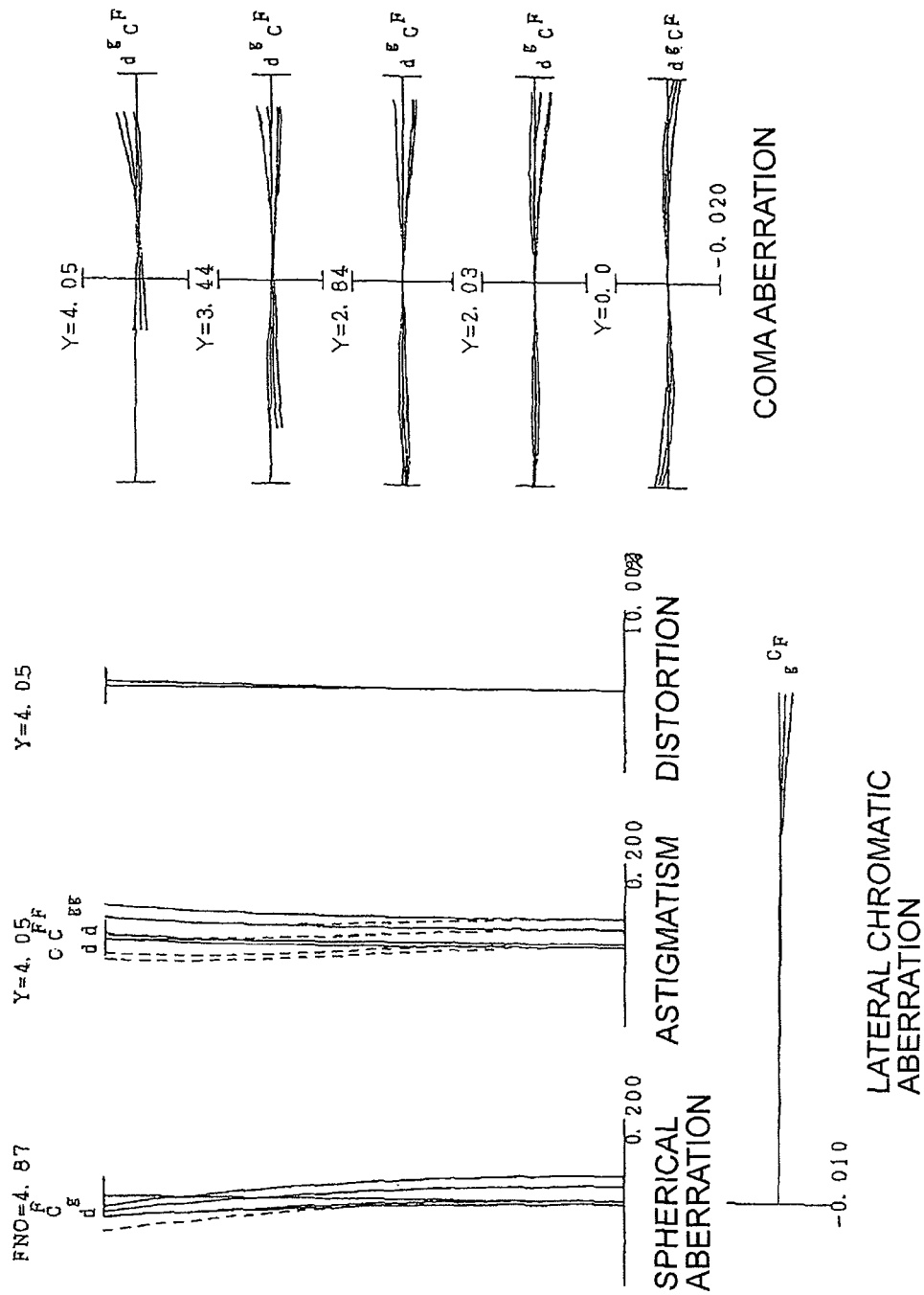

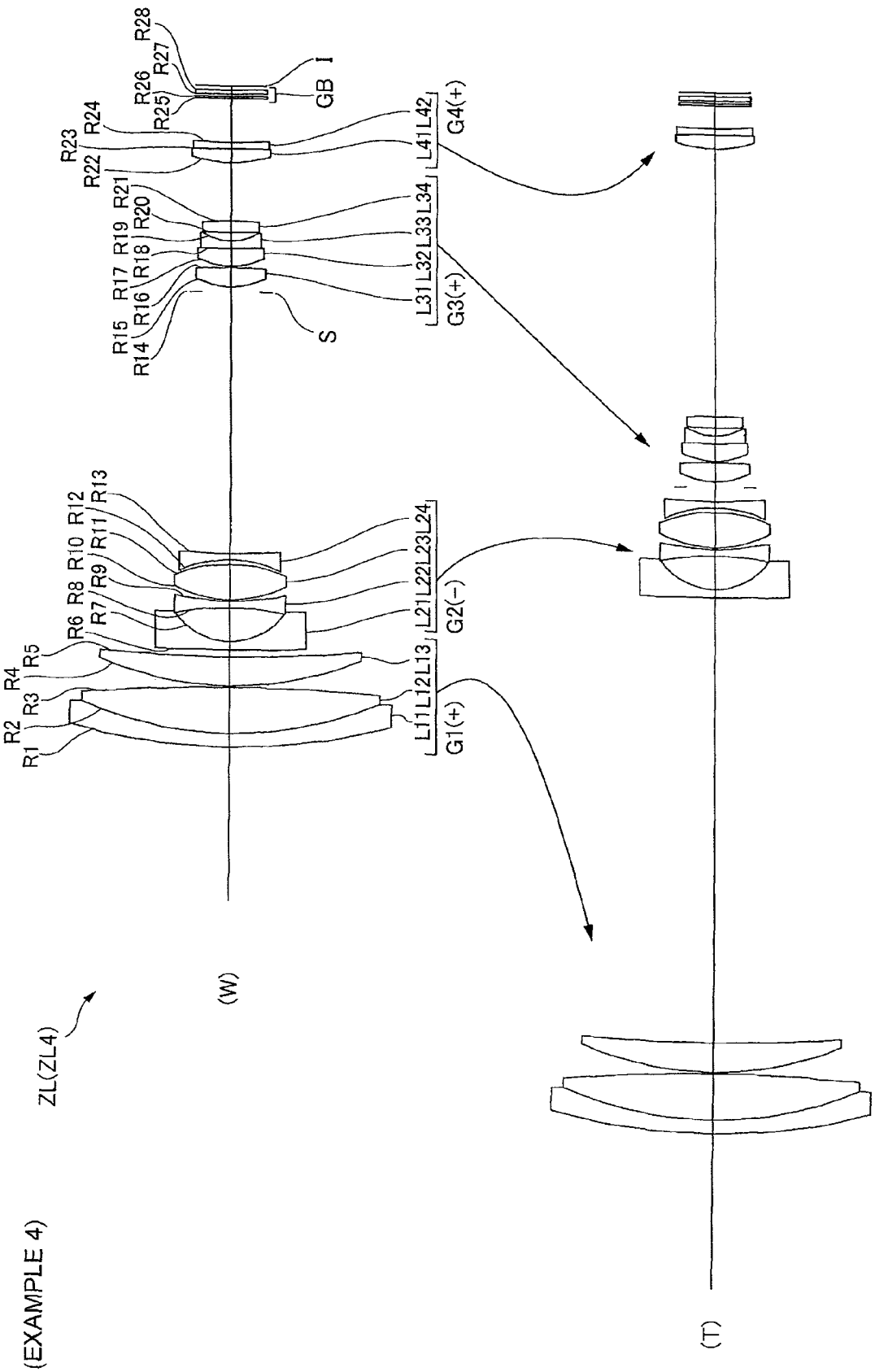

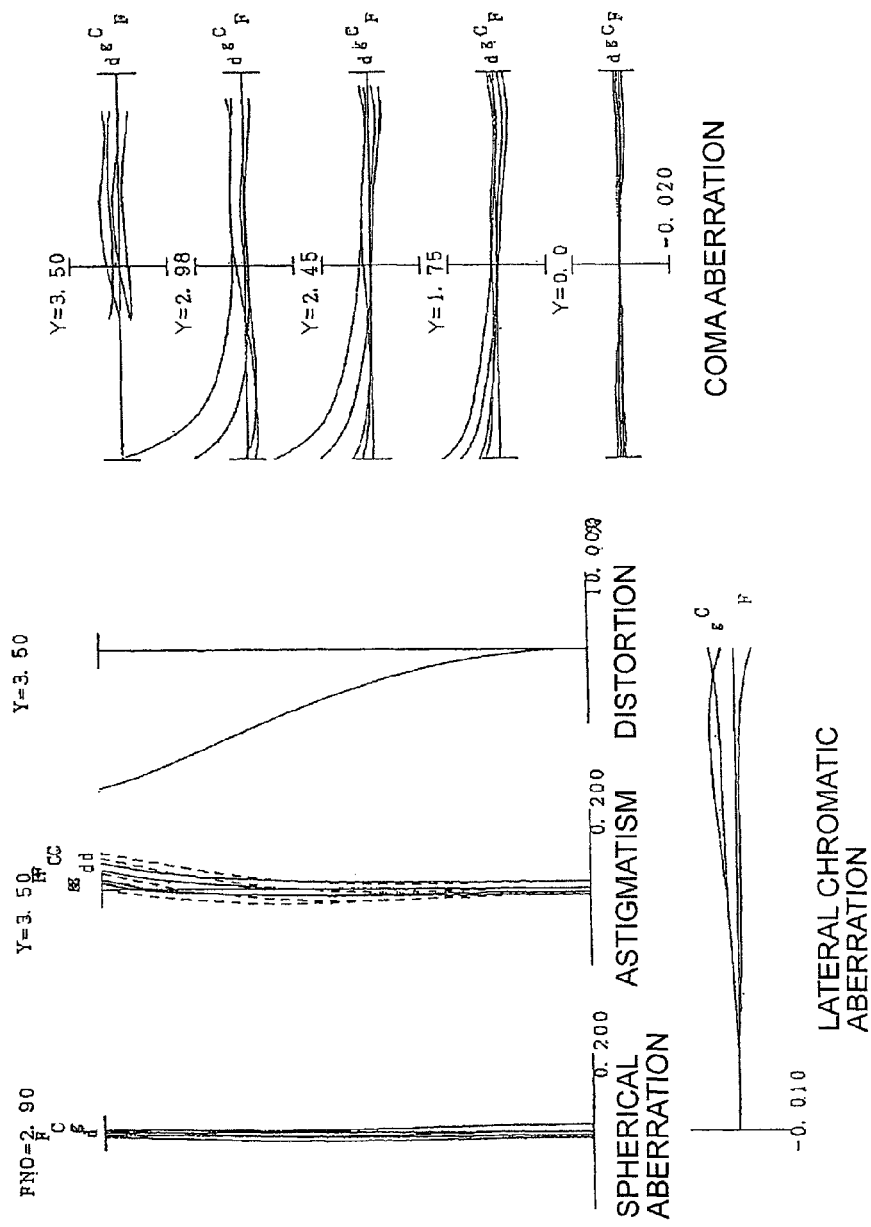

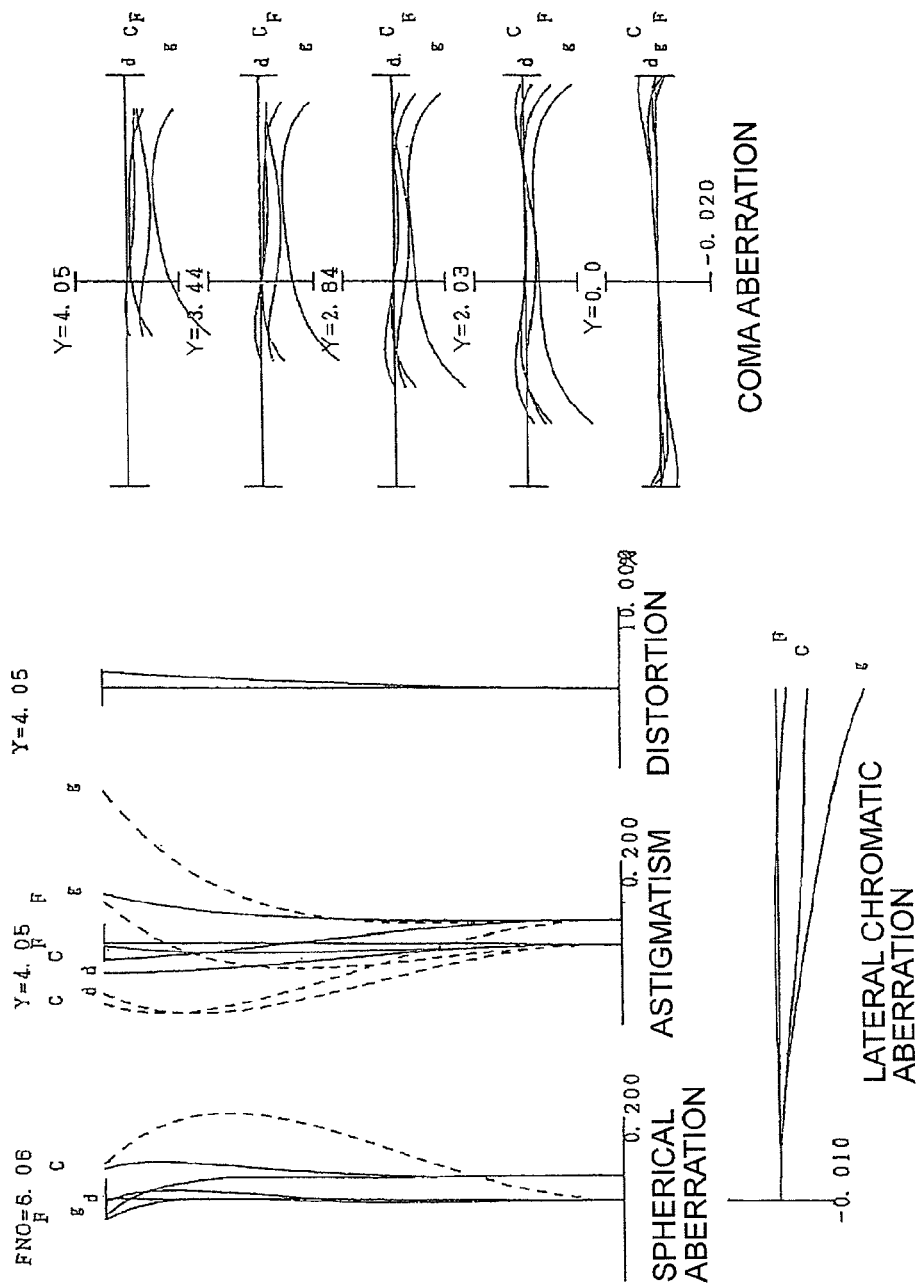

ZOOM LENS, OPTICAL APPARATUS, AND METHOD FOR MANUFACTURING ZOOM LENS

TECHNICAL FIELD

The present invention relates to a zoom lens, an optical apparatus and a method for manufacturing the zoom lens.

TECHNICAL BACKGROUND

In a zoom lens which is used for an imaging lens of a video camera, an electronic still camera or the like, further miniaturization and higher magnification are being attempted (see Patent Document 1).

PRIOR ART LIST

Patent Document

Patent Document 1: Japanese Laid-Open Patent Publication No. 2010-160242 (A)

SUMMARY OF THE INVENTION

Problems to be Solved by the Invention

In recent years, a further increase in magnification is demanded.

With the foregoing in view, it is an object of the present invention to provide a zoom lens and an optical apparatus which are ideal for a video camera and an electronic still camera using a solid-state image sensor, have a higher zoom ratio than prior art, and have compactness, ultra high image quality and high magnification, and a method for manufacturing the zoom lens.

Means to Solve the Problems

To achieve this object, the present invention is a zoom lens having, in order from an object: a first lens group having positive refractive power; a second lens group having negative refractive power, a third lens group having positive refractive power; and a fourth lens group having positive refractive power, in which the first lens group includes only, in order from the object, a cemented lens of a negative lens and a positive lens, and a positive meniscus lens having a convex surface facing the object, an aperture stop for determining brightness is disposed to the object side of the third lens group, all of the four groups move and the aperture stop moves together with the third lens group upon zooming, and the following conditional expression is satisfied.

$$\nu dp1 > 85.0$$

where vdp1 denotes an Abbe number of the positive lens, which is disposed closest to the object in the first lens group, at the d-line as a standard.

In the present invention, it is preferable that the second lens group moves toward an image plane once and then moves toward the object upon zooming.

In the present invention, it is preferable that the following conditional expression is satisfied.

$$\nu dp2 > 60.0$$

where vdp2 denotes an Abbe number of the positive lens, which is disposed closest to the image plane in the first lens group, at the d-line as a standard.

In the present invention, it is preferable that the second lens group includes only, in order from the object, a negative lens, a negative lens, a positive lens and a negative lens.

In the present invention it is preferable that the third lens group includes only, in order from the object, a positive lens, a cemented lens of a positive lens and a negative lens, and a positive lens.

In the present invention, it is preferable that the fourth lens group includes only a cemented lens of a positive lens and a negative lens which are disposed in order from the object.

In the present invention, it is preferable that the following conditional expression is satisfied.

$$0.05 < (-fG2)/fG1 < 0.15$$

where fG1 denotes a focal length of the first lens group, and fG2 denotes a focal length of the second lens group.

In the present invention, it is preferable that the following conditional expression is satisfied.

$$0.200 < \nu dn1/\nu dp1 < 0.400$$

where vdn1 denotes an Abbe number of the negative lens, which is disposed closest to the object in the first lens group, at the d-line as a standard, and vdp1 denotes an Abbe number of the positive lens, which is disposed closest to the object in the first lens group, at the d-line as a standard.

In the present invention, it is preferable that the fourth lens group moves toward the object once and then moves toward an image plane upon zooming.

In the present invention, it is preferable that the third lens group includes at least one aspherical lens.

The present invention provides an optical apparatus (e.g. a digital still camera CAM according to the present embodiment) including the zoom lens.

The present invention is a method for manufacturing a zoom lens including, in order from an object, a first lens group having positive refractive power, a second lens group having negative refractive power, a third lens group having positive refractive power and a fourth lens group having positive refractive power, the method including installing each lens in a lens barrel so that the first lens group includes only, in order from the object, a cemented lens of a negative lens and a positive lens, and a positive meniscus lens having a convex surface facing the object, all of the four groups move and an aperture stop for determining brightness moves together with the third lens group upon zooming, and the following conditional expression is satisfied:

$$\nu dp1 > 85.0$$

where vdp1 denotes an Abbe number of the positive lens, which is disposed closest to the object in the first lens group, at the d-line as a standard

Advantageous Effects of the Invention

The present invention can provide a zoom lens and an optical apparatus which are ideal for a video camera and an electronic still camera using a solid-state image sensor, have a higher zoom ratio than prior art, and have compactness, ultra high image quality and high magnification, and a method for manufacturing the zoom lens.

BRIEF DESCRIPTION OF THE DRAWINGS

FIG. 1 shows a configuration of a zoom lens according to Example 1 and a zoom locus from a wide-angle end state (W) to a telephoto end state (T);

FIG. 3A and FIG. 3B are graphs showing various aberrations of the zoom lens according to Example 1, where FIG. 3A are graphs showing various aberrations of the zoom lens upon focusing on infinity in the intermediate focal length state on the telephoto end side, and FIG. 3B are graphs showing various aberrations of the zoom lens upon focusing on infinity in the telephoto end state;

FIG. 4 shows a configuration of a zoom lens according to Example 2 and a zoom locus from a wide-angle end state (W) to a telephoto end state (T);

FIG. 6A and FIG. 6B are graphs showing various aberrations of the zoom lens according to Example 2, where FIG. 6A are graphs showing various aberrations of the zoom lens upon focusing on infinity in the intermediate focal length state on the telephoto end side, and FIG. 6B are graphs showing various aberrations of the zoom lens upon focusing on infinity in the telephoto end state;

FIG. 7 shows a configuration of a zoom lens according to Example 3 and a zoom locus from a wide-angle end state (W) to a telephoto end state (T);

FIG. 9A and FIG. 9B are graphs showing various aberrations of the zoom lens according to Example 3, where FIG. 9A are graphs showing various aberrations of the zoom lens upon focusing on infinity in the intermediate focal length state on the telephoto end side, and FIG. 9B are graphs showing various aberrations of the zoom lens upon focusing on infinity in the telephoto end state;

FIG. 10 shows a configuration of a zoom lens according to Example 4 and a zoom locus from a wide-angle end state (W) to a telephoto end state (T);

FIG. 11A and FIG. 11B are graphs showing various aberrations of the zoom lens according to Example 4, where FIG. 11A are graphs showing various aberrations of the zoom lens upon focusing on infinity in the wide-angle end state, and FIG. 11B are graphs showing various aberrations of the zoom lens upon focusing on infinity in the intermediate focal length state on the wide-angle end side;

FIG. 12A and FIG. 12B are graphs showing various aberrations of the zoom lens according to Example 4, where FIG. 12A are graphs showing various aberrations of the zoom lens upon focusing on infinity in the intermediate focal length state on the telephoto end side, and FIG. 12B are graphs showing various aberrations of the zoom lens upon focusing on infinity in the telephoto end state;

FIG. 13 are diagrams depicting a digital camera (optical apparatus) including the zoom lens according to this embodiment, where

DESCRIPTION OF THE EMBODIMENTS

Figure 2A:
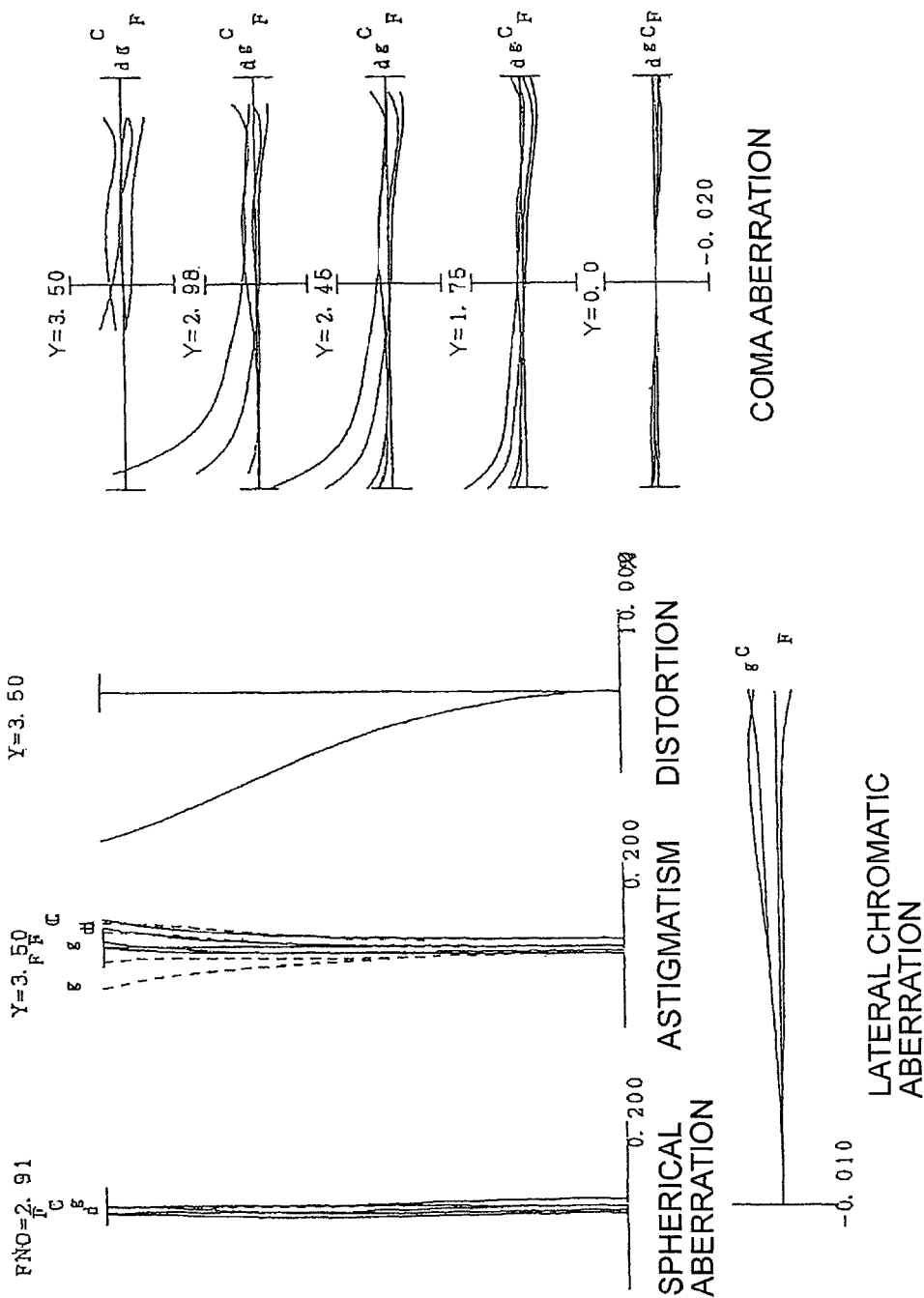
FIG. 2A and FIG. 2B are graphs showing various aberrations of the zoom lens according to Example 1, where FIG. 2A are graphs showing various aberrations of the zoom lens upon focusing on infinity in the wide-angle end state, and FIG. 2B are graphs showing various aberrations of the zoom lens upon focusing on infinity in the intermediate focal length state on the wide-angle end side.

Embodiments of the present invention will now be described with reference to the drawings. As illustrated in FIG. 1, a zooms lens ZL according to this embodiment includes, in order from an object, a first lens group G1 having positive refractive power, a second lens group G2 having negative refractive power, a third lens group G3 having positive refractive power and a fourth lens group G4 having positive refractive power, and a first lens group G1 includes only, in order from the object, a cemented lens of a negative lens L11 and a positive lens L12, and a positive meniscus lens L13 having a convex surface facing the object, an aperture stop S for determining brightness is disposed to the object side of the third lens group G3, and upon zooming, all of the four groups G1 to G4 move and the aperture stop S moves together with the third lens group G3. Because of this configuration, the lateral chromatic aberration and spherical aberration generated in the first lens group G1 can be sufficiently corrected. As a result, the lateral chromatic aberration and spherical aberration generated in the telephoto end state of zooming can be sufficiently corrected.

Upon zooming, the aperture stop S for determining brightness moves together with the third lens group G3, whereby fluctuation of a diameter of a luminous flux that passes through the third lens group G3 can be suppressed, and fluctuation of spherical aberration by zooming can be corrected well.

The zoom lens ZL of this embodiment satisfies the following conditional expression (1).

$$\nu dp1 > 85.0 \tag{1}$$

where $\nu dp1$ denotes an Abbe number of the positive lens L12, which is disposed closest to the object in the first lens group G1, at the d-line (wavelength: 587.56 nm) as a standard.

The conditional expression (1) is for specifying a value of the Abbe number of the positive lens L12, which is disposed closest to the object in the first lens group G1. If the lower limit value of the conditional expression (1) is not reached, sufficiently correcting lateral chromatic aberration generated in the first lens group G1 becomes difficult. As a result, sufficiently correcting the lateral chromatic aberration in the telephoto end state of zooming becomes difficult, which is not desirable.

To demonstrate the effect of this embodiment with certainty, it is preferable that the lower limit value of the conditional expression (1) is 87.5. To demonstrate the effect of the embodiment even more so, it is preferable that the lower limit value of the conditional expression (1) is 90.0.

In the zoom lens ZL of this embodiment, it is preferable that the second lens group G2 moves toward the image plane once and then moves toward the object upon zooming. Because of this configuration, fluctuation of the position of the image plane due to zooming can be sufficiently corrected.

In the zoom lens ZL of this embodiment, it is preferable that the following conditional expression (2) is satisfied.

$$\nu dp2 > 60.0 \tag{2}$$

where vdp2 denotes an Abbe number of the positive lens L13, which is disposed closest to the image plane in the first lens group G1, at the d-line (wavelength: 587.56 nm) as a standard.

The conditional expression (2) is for specifying a value of the Abbe number of the positive lens L13, which is disposed closest to the image plane in the first lens group G1. If the lower limit value of the conditional expression (2) is not reached, sufficiently correcting lateral chromatic aberration generated in the first lens group G1 becomes difficult. As a result, sufficiently correcting the lateral chromatic aberration in the telephoto end state of zooming becomes difficult, which is not desirable.

To demonstrate the effect of this embodiment with certainty, it is preferable that the lower limit value of the conditional expression (2) is 70.0. To demonstrate the effect of the embodiment even more so, it is preferable that the lower limit value of the conditional expression (2) is 80.0.

In the zoom lens ZL of this embodiment, it is preferable that the second lens group G2 includes only, in order from the object, a negative lens L21, a negative lens L22, a positive lens L23 and a negative lens L24. Because of this configuration, astigmatism in the wide-angle end state of zooming can be sufficiently corrected.

In the zoom lens ZL of this embodiment, it is preferable that the third lens group G3 includes only, in order from the object, a positive lens L31, a cemented lens of a positive lens L32 and a negative lens L33, and a positive lens L34. Because of this configuration, fluctuation of longitudinal chromatic aberration and spherical aberration due to zooming can be sufficiently corrected.

In the zoom lens ZL of this embodiment, it is preferable that the fourth lens group G4 includes only a cemented lens of a positive lens L41 and a negative lens L42 which are disposed in order from the object. Because of this configuration, lateral chromatic aberration in the intermediate focal length state of zooming can be sufficiently corrected.

In the zooms lens ZL of this embodiment, it is preferable that the following conditional expression (3) is satisfied.

$$0.05 < (-fG2)/fG1 < 0.15 \quad (3)$$

where fG1 denotes a focal length of the first lens group G1, and fG2 denotes a focal length of the second lens group G2.

The conditional expression (3) specifies a ratio of the focal length of the first lens group G1 and that of the second lens group G2. If the upper limit value of the conditional expression (3) is exceeded, the internal chromatic aberration and the spherical aberration generated in the first lens group G1 increase, and correction of the lateral chromatic aberration and the spherical aberration due to zooming becomes difficult, which is not desirable. If the lower limit value of the conditional expression (3) is not reached, astigmatism generated in the second lens group G2 increases, and correction of astigmatism due to zooming becomes difficult, which is not desirable.

In the zoom lens ZL of this embodiment, it is preferable that the following conditional expression (4) is satisfied.

$$0.200 < vdn1/vdp1 < 0.400 \quad (4)$$

where vdn1 denotes an Abbe number of the negative lens which is disposed closest to the object in the first lens group, at the d-line (wavelength: 587.56 nm) as a standard, and vdp1 denotes an Abbe number of the positive lens, which is disposed closest to the object in the first lens group, at the d-line (wavelength: 587.56 nm) as a standard.

The conditional expression (4) specifies the ratio of the Abbe number of the negative lens L11 which is disposed closest to the object in the first lens group G1, and the abbe number of the positive lens L12 which is disposed closest to the object in the first lens group G1. If the upper limit value of the conditional expression (4) is exceeded, the lateral chromatic aberration generated in the first lens group G1 increases, and correction of the lateral chromatic aberration by zooming becomes difficult, which is not desirable. If the lower limit value of the conditional expression (4) is not reached, sufficiently correcting the longitudinal chromatic aberration due to zooming becomes difficult, which is not desirable.

To demonstrate the effect of this embodiment with certainty, it is preferable that the upper limit value of the conditional expression (4) is 0.390. To demonstrate the effect of this embodiment with certainty, it is preferable that the lower limit value of the conditional expression (4) is 0.250.

In the zoom lens ZL of this embodiment, it is preferable that the fourth lens group G4 moves toward the object once and then moves toward the image plane upon zooming. Because of this configuration, fluctuation of the position of the image plane due to zooming can be sufficiently corrected.

In the zoom lens ZL of this embodiment, it is preferable that the third lens group G3 includes at least one aspherical lens. Because of this configuration, fluctuation of spherical aberration due to zooming can be sufficiently corrected.

Figure 13A:
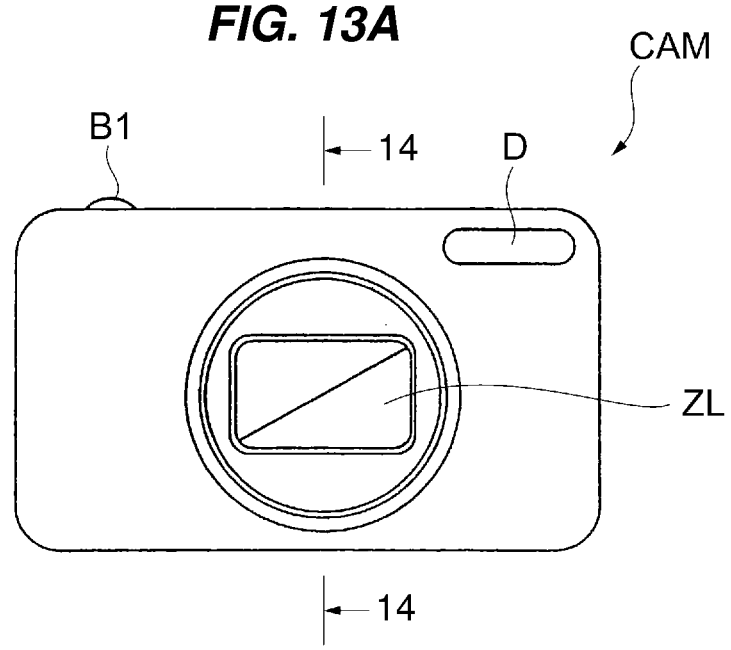
FIG. 13A is a front view and FIG. 13B is a rear view.
Figure 13B:
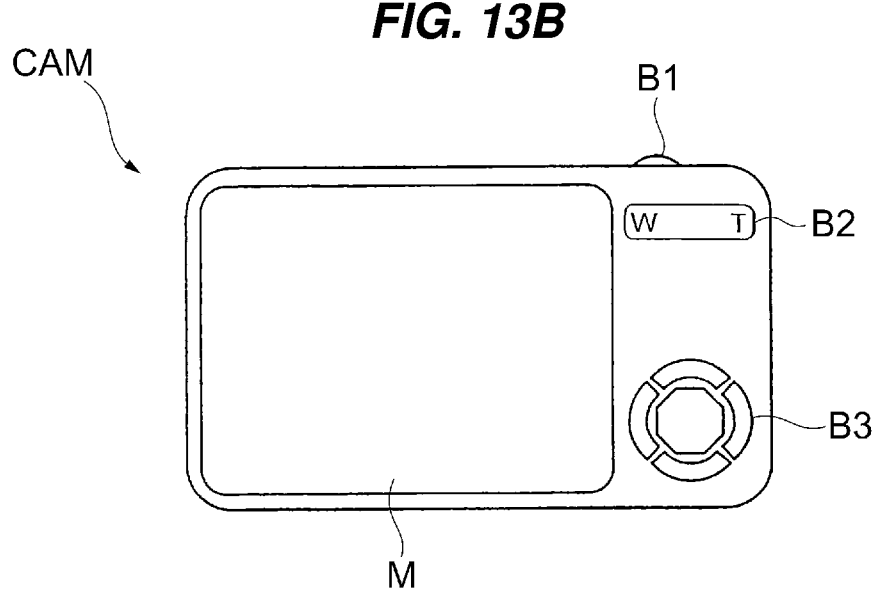
Figure 14:
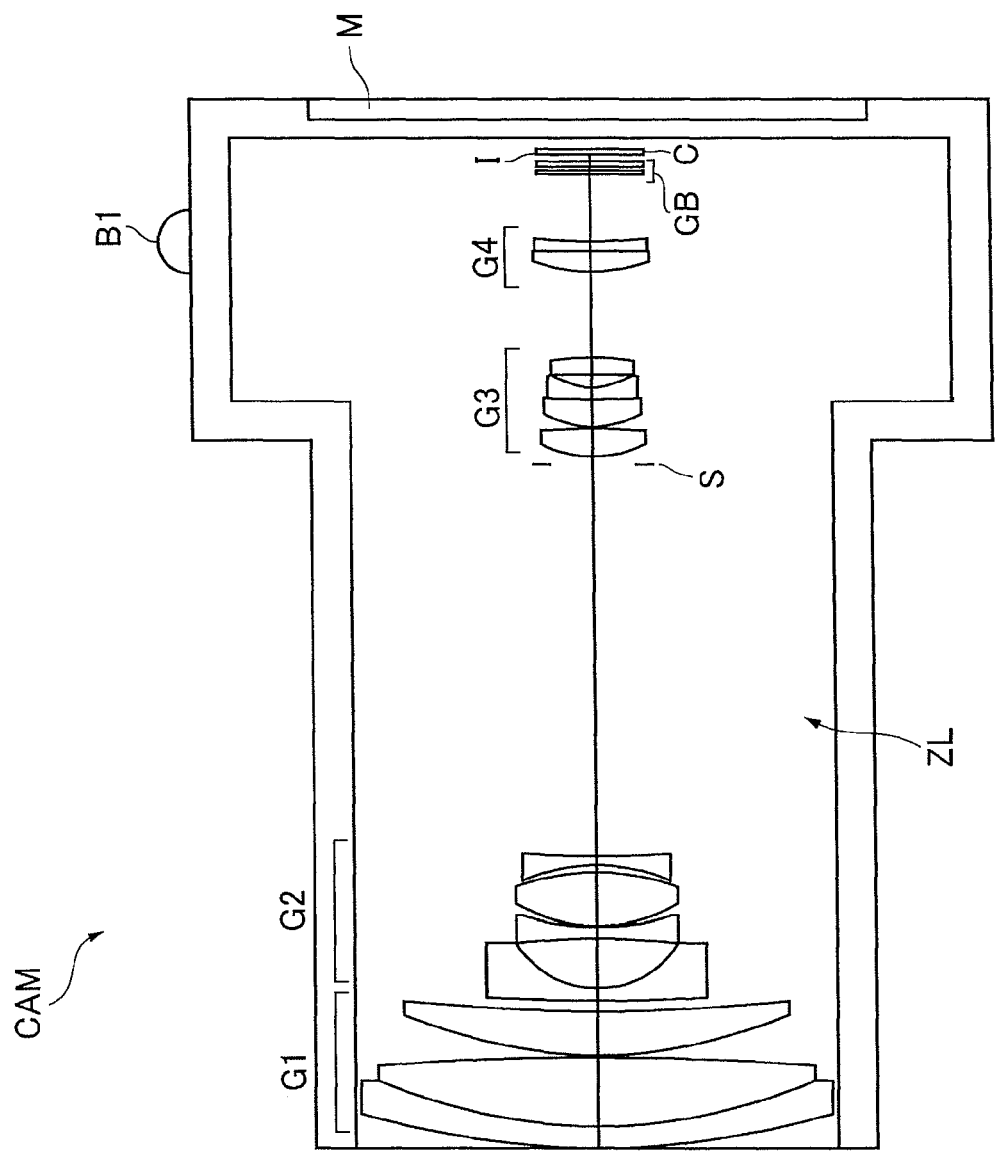
FIG. 14 is a cross-sectional view sectioned at the 14-14 line in FIG. 13A.

FIG. 13 and FIG. 14 show a configuration of a digital still camera CAM (optical apparatus) as an optical apparatus including the above mentioned zoom lens ZL. If a power button (not illustrated) is pressed on the digital still camera CAM, a shutter (not illustrated) of an imaging lens (zoom lens ZL) is released, and light from an object is collected by the zoom lens ZL, and forms an image on a picture element C (e.g. CCD and CMOS), which is disposed on the image plane I (e.g. see FIG. 1). The object image formed on the picture element C is displayed on a liquid crystal monitor M disposed on the back of the digital still camera CAM. The user determines the composition of the object image while viewing the liquid crystal monitor M, then presses a release button B1 to capture the object image by the picture element C, and stores it in memory (not illustrated).

This camera CAM includes an auxiliary light emitting unit D, which emits auxiliary light when the object is dark, a wide (W)-tele (T) button B2 for zooming the imaging lens ZL from a wide-angle end state (W) to a telephoto end state (T), and a function button B3, which is used for setting various conditions for the digital still camera CAM. FIG. 13 illustrates a compact type camera integrating the camera CAM and the zoom lens ZL, but the optical apparatus may be a single-lens reflex camera of which a lens barrel, including a zooms lens ZL and a camera body, can be detached.

Figure 15:
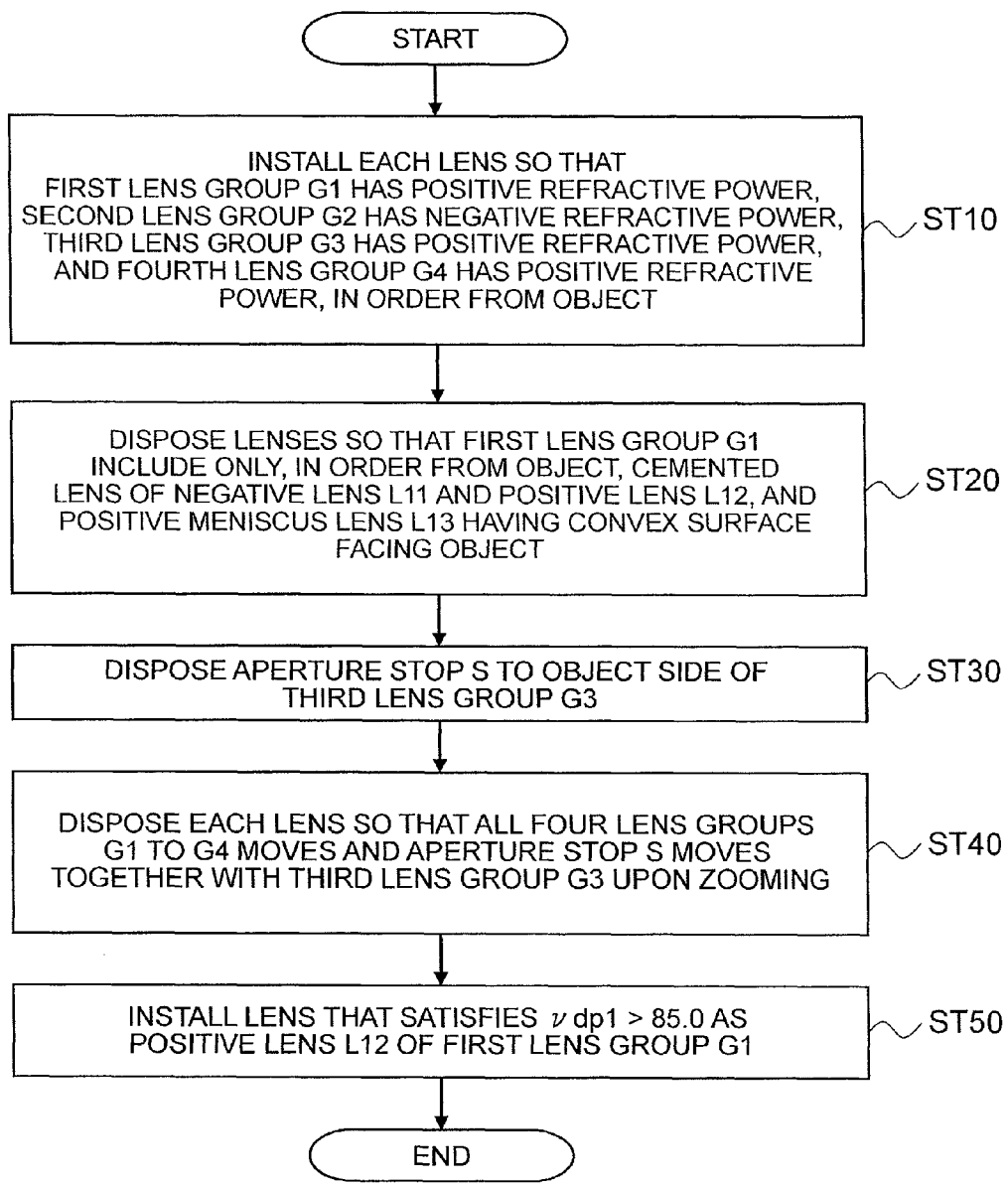
FIG. 15 is a flow chart depicting a method for manufacturing the zoom lens according to this embodiment.

Now a method for manufacturing the zoom lens ZL will be described with reference to FIG. 15. First the first lens group G1, the seconds lens group G2, the third lens group G3 and the fourth lens group G4 are installed in a lens barrel (step ST10). In this installation step, each lens is disposed so that the first lens group G1 has positive refractive power, the second lens group G2 has negative refractive power, the third lens group G3 has positive refractive power and the fourth lens group G4 has positive refractive power. Then each lens is disposed so that the first lens group G1 is constituted only by, in order from the object, the cemented lens of the negative lens L11 and the positive lens L12, and the positive meniscus lens L13 having a convex surface facing the object (step ST20). Then the aperture stop for determining brightness is disposed to the object side of the third lens group G3 (step ST30). In this case, each lens is disposed so that all the four groups G1 to G4 move, and the aperture stop S moves together with the third lens group G3 upon zooming (step ST40). And for the positive lens L12 which is disposed closest to the object in the first lens group G1, a lens that satisfies the following conditional expression (1), where vdp1 denotes an Abbe number of this lens at the d-line as a standard, is installed (step ST50).

$$vdp1 > 85.0 \quad (1)$$

For example, as the first lens group G1 of the zoom lens according to this embodiment, the cemented lens of a negative meniscus lens L11 having a convex surface facing the object and a biconvex positive lens L12 and a positive meniscus lens L13 having a convex surface facing the object are disposed in order from the object, as illustrated in FIG. 1. As the second lens group G2, a negative meniscus lens L21 having a convex surface facing the object, a biconcave negative lens L22, a biconvex positive lens L23 and a biconcave negative lens L24 are disposed in order from the object. As the third lens group G3, a biconvex positive lens L31, a cemented lens of a positive meniscus lens L32 having a convex surface facing the object and a negative meniscus lens L33 having a convex surface facing the object, and a biconvex positive lens L34 are disposed in order from the object. As a fourth lens group G4, a cemented lens of a biconvex positive lens L41 and a biconcave negative lens L42 is disposed. An Abbe number vdp1 of the biconvex positive lens L12, which is disposed closest to the object in the first lens group G1, is set to 95.0 at the d-line as a standard.

The method for manufacturing the zoom lens of this embodiment described above can implement a zoom lens which is ideal for a video camera and an electronic still camera using a solid-state image sensor, has a higher zoom ratio than prior art, and has compactness, ultra high image quality and high magnification.

EXAMPLES

Each example of this embodiment will now be described with reference to the drawings. Table 1 to Table 4 shown below list each data of Example 1 to Example 4 respectively.

In [Lens Data] in each table, the surface number is the sequential number of the lens surface counted from the object side in the light traveling direction, R is the radius of curvature of each lens surface, D is a distance from each optical surface to the next optical surface (or image plane) on the optical axis, nd is a refractive index at the d-line (wavelength: 587.56 nm) of the glass material used for the lens, and vd is an Abbe number of the glass material used for the lens at the d-line (wavelength: 587.56 nm) as a standard. "∞" of the radius of curvature indicates a plane or an aperture. The refractive index of air 1.000000 is omitted.

In [Aspherical Data] in each table, a form of the aspherical surface shown in [Lens Data] is indicated by the following expression (a). X(y) denotes a distance along the optical axis, from the tangential plane at the vertex of the aspherical surface to the position on the aspherical surface at the height y, R denotes a radius of curvature (paraxial radius of curvature) of the reference spherical surface, κ denotes a conical coefficient, and Ai denotes an aspherical coefficient to the i degree. "E-n" indicates "×10$^{-n}$". For example, 1.234E-05=1.234×10$^{-5}$.

$$X(y)=y^2/[R \times \{1+(1-\kappa \times y^2/R^2)^{1/2}\}]+A4 \times y^4+A6 \times y^6+A8 \times y^8+A10 \times y^{10} \quad (a)$$

In [General Data] in each table, f denotes a focal length, FNo denotes an F number, ω denotes a half angle of view, Y denotes an image height, TL denotes a total lens length, Bf denotes a distance from an image side surface of an optical member which is disposed closest to the image side to the paraxial image plane, and Bf (converted into air) denotes a distance when the distance from the final lens surface to the paraxial image plane is converted into air.

In [Zooming Data] in each table, Di (i is an integer) denotes a variable distance between the i-th surface and the (i+1)th surface in each of the wide-angle end state, intermediate focal length state (intermediate position 1 and intermediate position 2) and telephoto end state.

In [Zoom Lens Group Data], G denotes a group number, the first surface of a group indicates a surface number of the surface closest to the object in each group, the group focal length indicates a focal length of each group, and the lens configuration length indicates a length from the lens surface closest to the object in each group to the lens surface closest to the image in each group.

In [Conditional Expression] in each table, a value corresponding to each conditional expression (1) to (4) is shown.

In all the data values, "mm" is normally used as the unit of focal length f, radius of curvature R, surface distance D and other lengths, but unit is not limited to "mm", since an equivalent optical performance is obtained even if an optical system is proportionally expanded or proportionally reduced. The unit is not limited to "mm", but another appropriate unit can be used.

The above description on a table is common to all the examples, therefore this description is omitted herein below.

Example 1

Example 1 will now be described with reference to FIG. 1 to FIG. 3 and Table 1. FIG. 1 shows a configuration of a zoom lens ZL (ZL1) according to Example 1 and a zoom locus from the wide-angle end state (W) to the telephoto end state (T). As illustrated in FIG. 1, the zoom lens ZL1 according to Example 1 includes, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, and a positive meniscus line L13 having a convex surface facing the object.

The second lens group G2 includes, in order from the object, a negative meniscus lens L21 having a convex surface facing the object, a biconcave negative lens L22, a biconvex positive lens L23 and a biconcave negative lens L24.

The third lens group G3 includes, in order from the object, a biconvex positive lens L31, a cemented lens of a positive meniscus lens L32 having a convex surface facing the object and a negative meniscus lens L33 having a convex surface facing the object, and a biconvex positive lens L34.

The fourth lens group G4 includes a cemented lens of a biconvex positive lens L41 and a biconcave negative lens L42, which are disposed in order from the object.

Between the fourth lens group G4 and the image plane I, a glass block GB, such as a low-pass filter and an infrared cut-off filter, is disposed for cutting off a spatial frequency not less than a critical resolution of a solid-state image sensor C (e.g. CCD, CMOS) disposed on the image plane I.

In the zoom lens ZL1 having this configuration, all of the four groups G1 to G4 move upon zooming from the wide-angle end state to the telephoto end state. In this case, the first lens group G1 moves toward the image plane once and then moves toward the object. The second lens group G2 moves toward the image plane once and then moves toward the object. The third lens group G3 moves toward the object. The fourth lens group G4 moves toward the object once and then moves toward the image plane. The aperture stop S for determining brightness moves together with the third lens group G3 toward the object upon zooming.

Table 1 shows each data value of Example 1. The surface numbers 1 to 28 in Table 1 correspond to each optical surface with radius of curvatures R1 to R28 in FIG. 1. In Example 1, surface 15 and surface 16 are formed to be aspherical.

TABLE 1

[Lens Data]

| Surface number | R | D | nd | vd |
|---|---|---|---|---|
| Object surface | ∞ | | | |
| 1 | 76.9288 | 1.8000 | 1.910820 | 35.25 |
| 2 | 47.9825 | 6.0000 | 1.437000 | 95.00 |
| 3 | −221.3615 | 0.2000 | | |
| 4 | 42.5678 | 3.8000 | 1.497820 | 82.57 |
| 5 | 176.2978 | D5 | | |
| 6 | 281.2471 | 1.1000 | 1.902650 | 35.73 |
| 7 | 8.5375 | 4.3500 | | |
| 8 | −47.3993 | 0.9000 | 1.788000 | 47.35 |
| 9 | 22.7834 | 0.2000 | | |
| 10 | 14.2653 | 4.6000 | 1.805180 | 25.45 |
| 11 | −19.6976 | 0.6000 | | |
| 12 | −15.7768 | 0.8000 | 1.772500 | 49.62 |
| 13 | 87.9533 | D13 | | |
| 14 (Aperture stop) | ∞ | 0.7500 | | |
| *15 (Aspherical surface) | 10.0167 | 2.4000 | 1.592010 | 67.05 |
| *16 (Aspherical surface) | −52.0434 | 0.2000 | | |
| 17 | 8.6454 | 2.4000 | 1.497820 | 82.57 |
| 18 | 82.1508 | 1.0000 | 1.834000 | 37.18 |
| 19 | 6.7178 | 1.1000 | | |
| 20 | 113.4489 | 1.5000 | 1.497820 | 82.57 |
| 21 | −25.2898 | D21 | | |
| 22 | 16.3759 | 1.8000 | 1.589130 | 61.22 |
| 23 | −182.2597 | 0.8000 | 1.805180 | 25.45 |
| 24 | 65.6111 | D24 | | |
| 25 | ∞ | 0.2100 | 1.516800 | 63.88 |
| 26 | ∞ | 0.3900 | | |
| 27 | ∞ | 0.5000 | 1.516800 | 63.88 |
| 28 | ∞ | Bf | | |
| Image plane | ∞ | | | |

[Aspherical data]

Surface 15

κ = 0.1629, A4 = 3.31498E−05, A6 = −1.97146E−06,
A8 = 0.00000E+00, A10 = 0.00000E+00

Surface 16

κ = 1.0000, A4 = 5.40906E−05, A6 = −2.86274E−06,
A8 = 1.60868E−08, A10 = 0.00000E+00

[General Data] Zoom ratio 40.0000

| | Wide-angle end | Intermediate position 1 | Intermediate position 2 | Telephoto end |
|---|---|---|---|---|
| f | 4.40750 | 15.70000 | 47.60001 | 176.30006 |
| FNo | 2.90944 | 3.97722 | 4.78754 | 6.08031 |
| ω | 44.16400 | 14.39427 | 4.83335 | 1.29114 |
| Y | 7.00000 | 7.80000 | 7.80000 | 7.80000 |
| TL | 86.05884 | 94.76026 | 116.30170 | 135.43826 |

TABLE 1-continued

| Bf | 0.53000 | 0.53000 | 0.53000 | 0.52999 |
|---|---|---|---|---|
| Bf (Converted into air) | 1.38809 | 1.38810 | 1.38809 | 1.38808 |

[Zooming Data]

| Variable distance | Wide-angle end | Intermediate position 1 | Intermediate position 2 | Telephoto end |
|---|---|---|---|---|
| D5 | 0.90008 | 21.69449 | 43.46347 | 57.97994 |
| D13 | 34.05040 | 12.02500 | 5.16835 | 1.84997 |
| D21 | 7.45633 | 7.91620 | 6.08540 | 34.64074 |
| D24 | 5.72394 | 15.19647 | 23.65638 | 3.03952 |

[Zoom Lens Group Data]

| Group number | First surface of group | Group focal length | Lens configuration Length |
|---|---|---|---|
| G1 | 1 | 78.07027 | 11.80 |
| G2 | 6 | −8.17069 | 12.55 |
| G3 | 15 | 17.15961 | 9.35 |
| G4 | 22 | 43.00000 | 2.60 |

[Conditional Expression]

Conditional expression (1)    vdp1 = 95.0
Conditional expression (2)    vdp2 = 82.57
Conditional expression (3)    (−fG2)/fG1 = 0.105
Conditional expression (4)    vdn1/vdp1 = 0.371

As the data in Table 1 shows, the zoom lens ZL1 according to this example satisfies all of the conditional expressions (1) to (4).

Figure 2B:
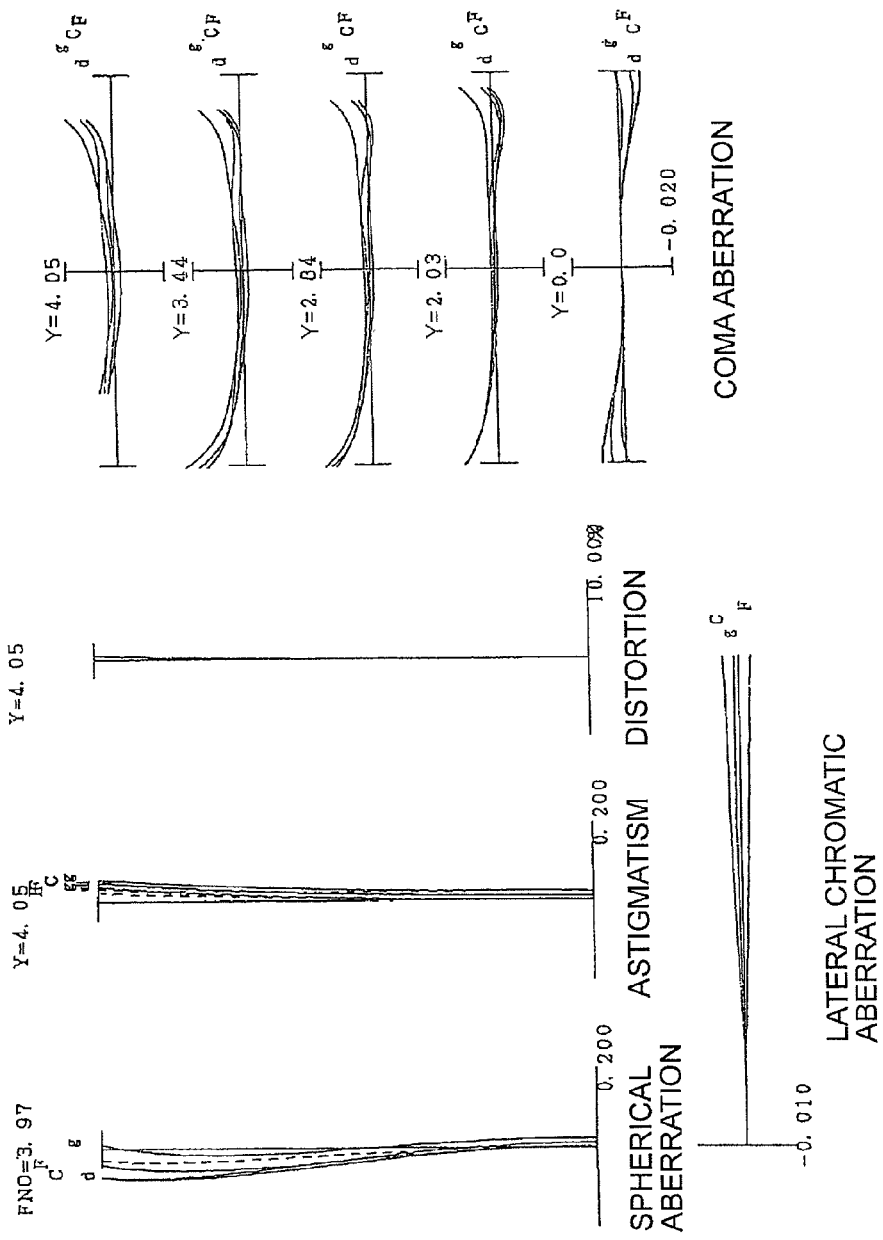

FIG. 2 and FIG. 3 are graphs showing various aberrations of the zoom lens ZL1 according to Example 1. FIG. 2A are graphs showing various aberrations of the zoom lens upon focusing on infinity in the wide-angle end state, FIG. 2B are graphs showing various aberrations of the zoom lens upon focusing on infinity in the intermediate focal length state on the wide-angle end side (intermediate position 1), FIG. 3A are graphs showing various aberrations of the zoom lens upon focusing on infinity in the intermediate focal length state on the telephoto end state (intermediate position 2), and FIG. 3B are graphs showing various aberrations of the zoom lens upon focusing on infinity in the telephoto end state.

In each graph showing aberrations, FNo denotes an F number, and Y denotes an image height. d, g, C and F denotes various aberrations at the d-line (wavelength: 587.6 nm), g-line (wavelength: 435.8 nm), C-line (wavelength: 656.3 nm) and F-line (wavelength: 486.1 nm) respectively. No indication refers to aberrations at the d-line. In the graphs showing spherical aberration, the solid line indicates spherical aberration and the broken line indicates sine conditions. In the graphs showing astigmatism, the solid line indicates the sagittal image surface, and the broken line indicates the meridional image surface. In the graphs showing coma aberration, the solid line indicates the meridional coma. The description on the graphs showing aberrations is the same as for other examples, and description is therefore omitted herein below.

As each graph showing aberrations clarifies, the zoom lens according to Example 1 has an excellent image forming performance, where various aberrations are ideally corrected in each focal length state from the wide-angle end state to the telephoto end state.

Example 2

Example 2 will now be described with reference to FIG. 4 to FIG. 6 and Table 2. FIG. 4 shows a configuration of a zoom lens ZL (ZL2) according to Example 2 and a zoom locus from the wide-angle end state (W) to the telephoto end state (T). As illustrated in FIG. 4, the zoom lens ZL2 according to Example 2 includes, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, and a positive meniscus lens L13 having a convex surface facing the object.

The second lens group G2 includes, in order from the object, a negative meniscus lens L21 having a convex surface facing the object, a biconcave negative lens L22, and a cemented lens of a biconvex positive lens L23 and a biconcave negative lens L24.

The third lens group G3 includes, in order from the object, a biconvex positive lens L31, a cemented lens of a positive meniscus lens L32 having a convex surface facing the object and a negative meniscus lens L33 having a convex surface facing the object, and a positive meniscus lens L34 having a convex surface facing the image.

The fourth lens group G4 includes a cemented lens of a biconvex positive lens L41 and a biconcave negative lens L42.

Between the fourth lens group G4 and the image plane I, a glass block GB, such as a low-pass filter and an infrared cut-off filter, is disposed for cutting off a spatial frequency not less than a critical resolution of a solid-state image sensor C (e.g. CCD, CMOS) disposed on the image plane I.

In the zoom lens ZL2 having this configuration, all of the four groups G1 to G4 move upon zooming from the wide-angle end state to the telephoto end state. In this case, the first lens group G1 moves toward the image plane once and then moves toward the object. The second lens group G2 moves toward the image plane once and then moves toward the object. The third lens group G3 moves toward the object. The fourth lens group G4 moves toward the object once and then moves toward the image plane. The aperture stop S for determining brightness moves together with the third lens group G3 toward the object upon zooming.

Table 2 shows each data value of Example 2. The surface numbers 1 to 27 in Table 2 correspond to each optical surface with radius of curvatures P1 to P27 in FIG. 4. In Example 2, surface 14 and surface 15 are formed to be aspherical.

TABLE 2

[Lens Data]

| Surface number | R | D | nd | νd |
|---|---|---|---|---|
| Object surface | ∞ | | | |
| 1 | 73.7491 | 1.8000 | 1.910820 | 35.25 |
| 2 | 47.1251 | 6.0000 | 1.437000 | 95.00 |
| 3 | −279.6405 | 0.2000 | | |
| 4 | 43.6242 | 3.8000 | 1.497820 | 82.57 |
| 5 | 204.4046 | D5 | | |
| 6 | 206.9524 | 1.1000 | 1.902650 | 35.73 |
| 7 | 8.1853 | 4.5000 | | |
| 8 | −42.0468 | 0.9000 | 1.788000 | 47.35 |
| 9 | 44.8258 | 0.2000 | | |
| 10 | 14.8008 | 4.6000 | 1.805180 | 25.45 |
| 11 | −13.4995 | 1.0000 | 1.883000 | 40.66 |
| 12 | 42.6389 | D12 | | |
| 13 | ∞ | 0.7500 | | |
| (Aperture stop) | | | | |
| *14 (Aspherical surface) | 10.5856 | 2.3000 | 1.592010 | 67.05 |
| *15 (Aspherical surface) | −31.9516 | 0.2000 | | |
| 16 | 8.3719 | 2.4000 | 1.497820 | 82.57 |
| 17 | 366.3843 | 1.0000 | 1.834000 | 37.18 |
| 18 | 6.8715 | 1.4000 | | |
| 19 | −22.1431 | 1.5000 | 1.497820 | 82.57 |
| 20 | −12.8809 | D20 | | |
| 21 | 16.4211 | 1.8000 | 1.589130 | 61.22 |
| 22 | −247.3838 | 0.8000 | 1.805180 | 25.45 |
| 23 | 64.4981 | D23 | | |
| 24 | ∞ | 0.2100 | 1.516800 | 63.88 |
| 25 | ∞ | 0.3900 | | |
| 26 | ∞ | 0.5000 | 1.516800 | 63.88 |
| 27 | ∞ | Bf | | |
| Image plane | ∞ | | | |

[Aspherical data]

Surface 14

κ = 0.2008, A4 = 2.04962E−05, A6 = 0.00000E+00,
A8 = 0.00000E+00, A10 = 0.00000E+00

Surface 15

κ = 1.0000, A4 = 8.40989E−05, A6 = −3.91763E−07,
A8 = 0.00000E+00, A10 = 0.00000E+00

[General Data] Zoom ratio 40.0000

| | Wide-angle end | Intermediate position 1 | Intermediate position 2 | Telephoto end |
|---|---|---|---|---|
| f | 4.40750 | 15.70000 | 47.60001 | 176.30006 |
| FNo | 2.89643 | 3.94568 | 4.74158 | 6.03502 |
| ω | 44.15746 | 14.39910 | 4.83198 | 1.29095 |
| Y | 7.00000 | 7.80000 | 7.80000 | 7.80000 |
| TL | 85.75414 | 94.45557 | 115.99700 | 135.13356 |
| Bf | 0.53000 | 0.53000 | 0.53000 | 0.52999 |
| Bf (Converted into air) | 1.38809 | 1.38810 | 1.38809 | 1.38808 |

[Zooming Data]

| Variable distance | Wide-angle end | Intermediate position 1 | Intermediate position 2 | Telephoto end |
|---|---|---|---|---|
| D5 | 0.90012 | 21.69453 | 43.46351 | 57.97998 |
| D12 | 34.05040 | 12.02500 | 5.16835 | 1.84997 |
| D20 | 7.19867 | 7.65855 | 5.82774 | 34.38309 |
| D23 | 5.72495 | 15.19748 | 23.65739 | 3.04053 |

[Zoom Lens Group Data]

| Group number | First surface of group | Group focal length | Lens configuration Length |
|---|---|---|---|
| G1 | 1 | 78.07027 | 11.80 |
| G2 | 6 | −8.17069 | 12.30 |
| G3 | 14 | 17.15961 | 9.55 |
| G4 | 21 | 43.00000 | 2.60 |

[Conditional Expression]

| | |
|---|---|
| Conditional expression (1) | νdp1 = 95.0 |
| Conditional expression (2) | νdp2 = 82.57 |
| Conditional expression (3) | (−fG2)/fG1 = 0.105 |
| Conditional expression (4) | νdn1/νdp1 = 0.371 |

As the data in Table 2 shows, the zoom lens ZL2 according to this example satisfies all of the conditional expressions (1) to (4).

Figure 5A:
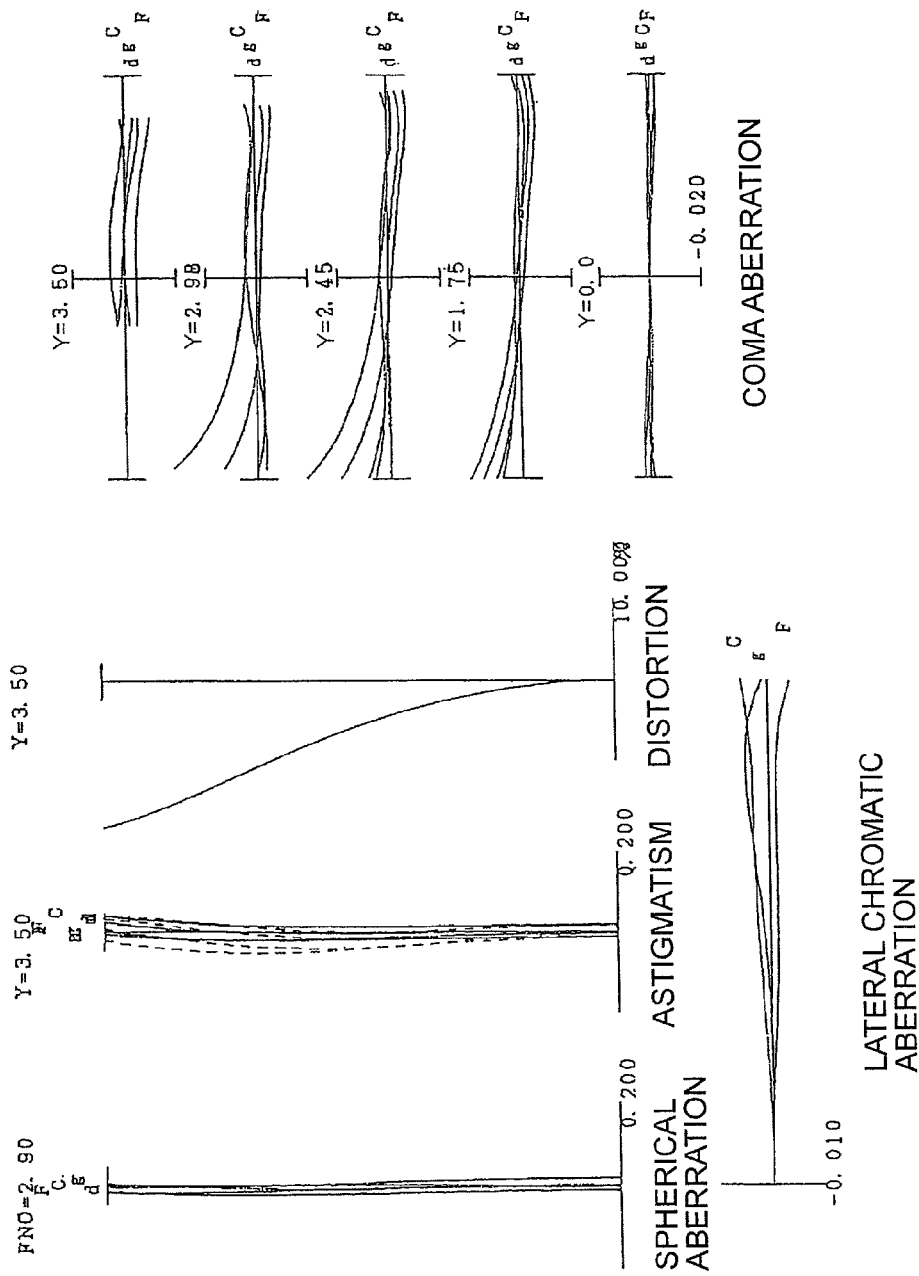
FIG. 5A and FIG. 5B are graphs showing various aberrations of the zoom lens according to Example 2, where FIG. 5A are graphs showing various aberrations of the zoom lens upon focusing on infinity in the wide-angle end state, and FIG. 5B are graphs showing various aberrations of the zoom lens upon focusing on infinity in the intermediate focal length state on the wide-angle end side.
Figure 5B:
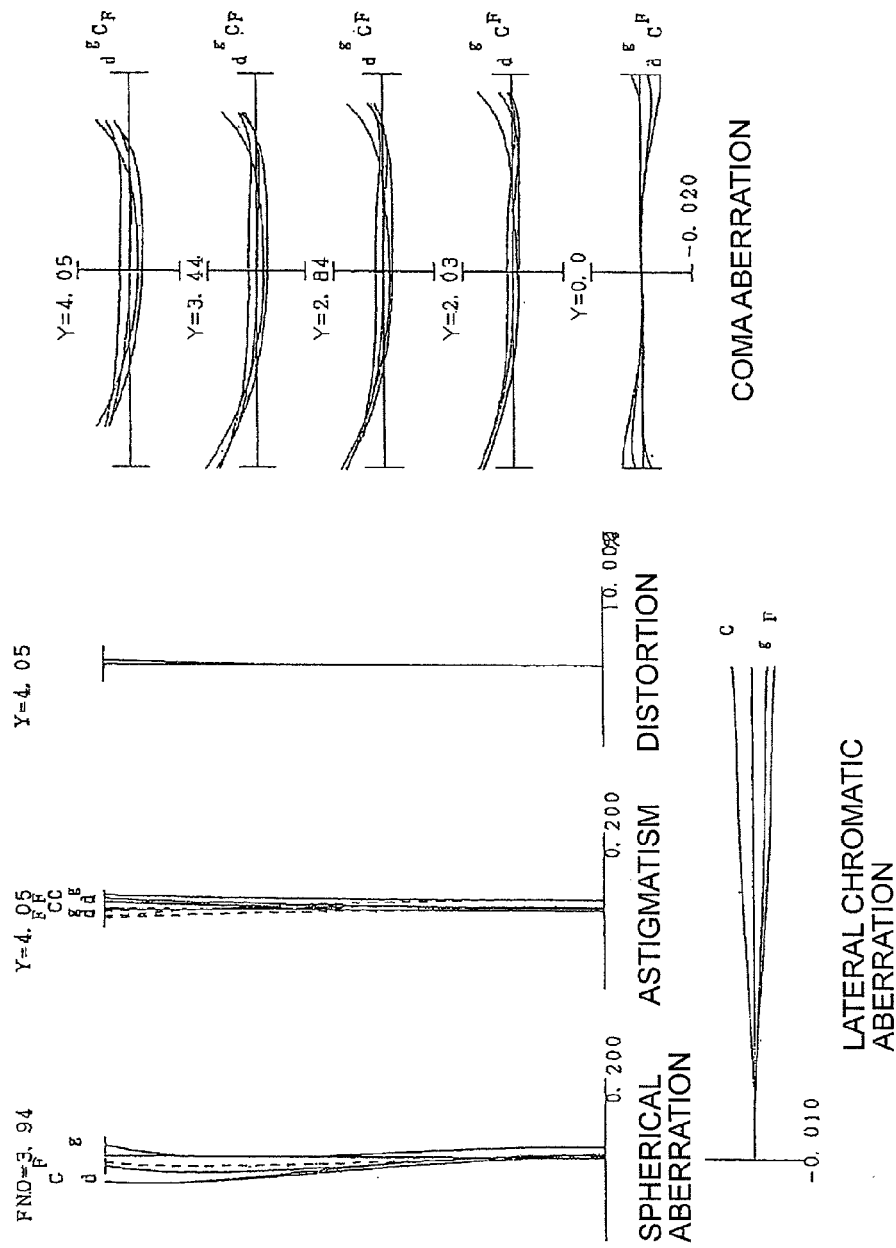
Figure 6B:
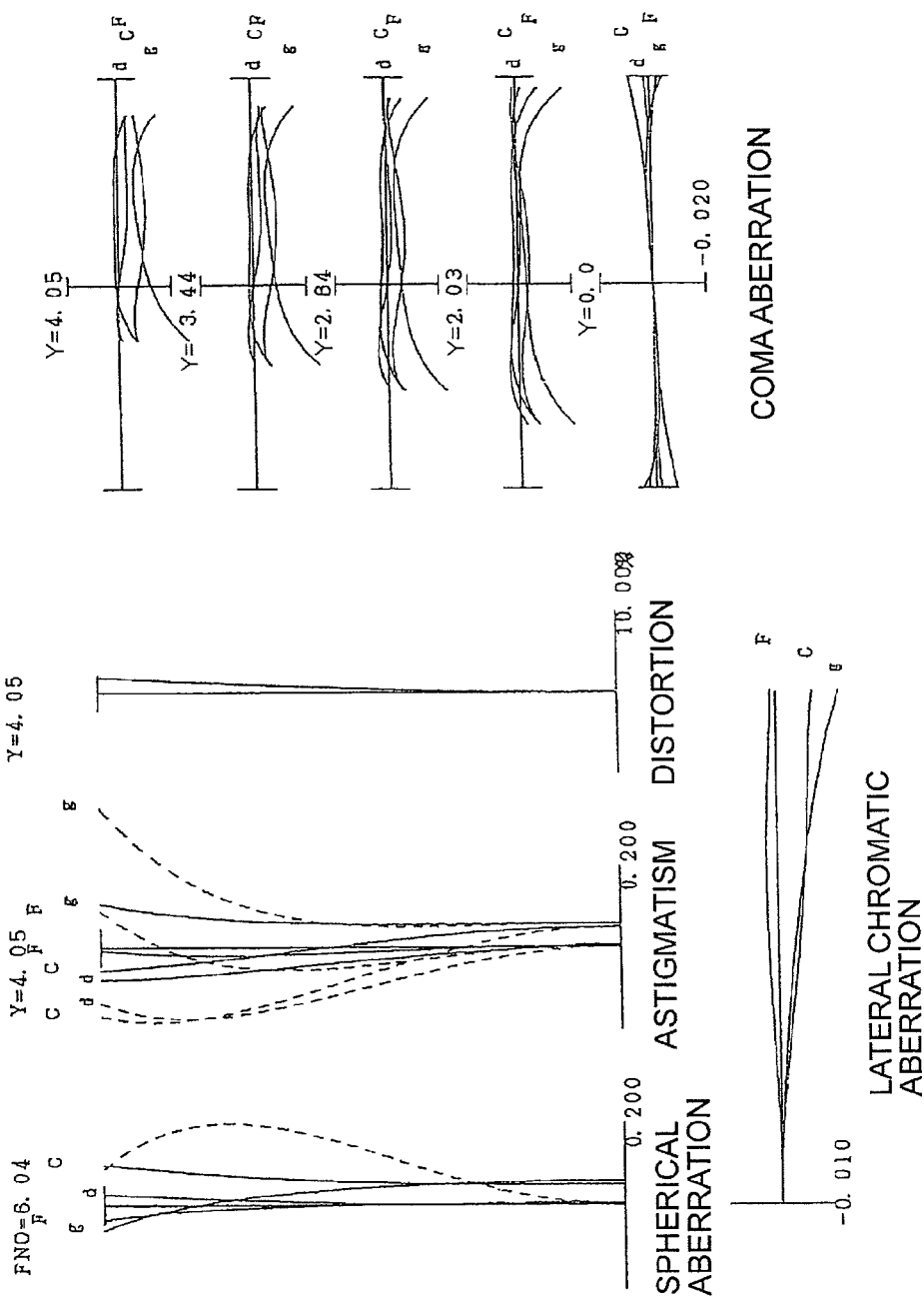

FIG. 5 and FIG. 6 are graphs showing various aberrations of the zoom lens ZL2 according to Example 2. FIG. 5A are graphs showing various aberrations of the zoom lens upon focusing on infinity in the wide-angle end state, FIG. 5B are graphs showing various aberrations of the zoom lens upon focusing on infinity in the intermediate focal length state on the wide-angle end side (intermediate position 1), FIG. 6A are graphs showing various aberrations of the zoom lens upon focusing on infinity in the intermediate focal length state on the telephoto end state (intermediate position 2), and FIG. 6B are graphs showing various aberrations of the zoom lens upon focusing on infinity in the telephoto end state.

As each graph showing aberrations clarifies, the zoom lens according to Example 2 has an excellent image forming performance, where various aberrations are ideally corrected in each focal length state from the wide-angle end state to the telephoto end state.

Example 3

Example 3 will now be described with reference to FIG. 7 to FIG. 9 and Table 3. FIG. 7 shows a configuration of a zoom lens ZL (ZL3) according to Example 3 and a zoom locus from the wide-angle end state (W) to the telephoto end state (T). As illustrated in FIG. 7, the zoom lens ZL3 according to Example 3 includes, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, and a positive meniscus lens L13 having a convex surface facing the object.

The second lens group G2 includes, in order from the object, a negative meniscus lens L21 having a convex surface facing the object, a biconcave negative lens L22, a biconvex positive lens L23, and a biconcave negative lens L24.

The third lens group G3 includes, in order from the object, a biconvex positive lens L31, a cemented lens of a positive meniscus lens L32 having a convex surface facing the object and a negative meniscus lens L33 having a convex surface facing the object, and a biconvex positive lens L34.

The fourth lens group G4 includes a cemented lens of a biconvex positive lens L41 and a biconcave negative lens L42.

Between the fourth lens group G4 and the image plane I, a glass block GB, such as a low-pass filter and an infrared cut-off filter, is disposed for cutting off a spatial frequency not less than a critical resolution of a solid-state image sensor C (e.g. CCD, CMOS) disposed on the image plane I.

In the zoom lens ZL3 having this configuration, all of the four groups G1 to G4 move upon zooming from the wide-angle end state to the telephoto end state. In this case, the first lens group G1 moves toward the image plane once, and then moves toward the object. The second lens group G2 moves toward the image plane once, and then moves toward the object. The third lens group G3 moves toward the object. The fourth lens group G4 moves toward the object once, and then moves toward the image plane. The aperture stop S for determining brightness moves together with the third lens group G3 toward the object upon zooming.

Table 3 shows each data value of Example 3. The surface numbers 1 to 28 in Table 3 correspond to each optical surface with radius of curvatures R1 to R28 in FIG. 7. In Example 3, surface 15 and surface 16 are formed to be aspherical.

TABLE 3

[Lens Data]

| Surface number | R | D | nd | vd |
|---|---|---|---|---|
| Object surface | ∞ | | | |
| 1 | 76.3753 | 1.8000 | 1.910820 | 35.25 |
| 2 | 47.9750 | 6.0000 | 1.437000 | 95.00 |
| 3 | −218.0715 | 0.2000 | | |
| 4 | 42.9114 | 3.8000 | 1.497820 | 82.57 |
| 5 | 177.4930 | D5 | | |
| 6 | 315.0519 | 1.1000 | 1.902650 | 35.73 |
| 7 | 8.6946 | 4.4000 | | |
| 8 | −31.8602 | 0.9000 | 1.788000 | 47.35 |
| 9 | 31.3673 | 0.2000 | | |
| 10 | 15.7719 | 4.6000 | 1.805180 | 25.45 |
| 11 | −17.5294 | 0.6000 | | |
| 12 | −14.3291 | 0.8000 | 1.772500 | 49.62 |
| 13 | 107.8052 | D13 | | |
| 14 (Aperture stop) | ∞ | 0.7500 | | |
| *15 (Aspherical surface) | 9.1580 | 2.4000 | 1.592010 | 67.05 |
| *16 (Aspherical surface) | −37.0828 | 0.2000 | | |
| 17 | 11.0772 | 2.4000 | 1.497820 | 82.57 |
| 18 | −134.8964 | 1.5000 | 1.834000 | 37.18 |
| 19 | 7.0370 | 1.0000 | | |
| 20 | 67.8174 | 1.5000 | 1.497820 | 82.57 |
| 21 | −26.8569 | D21 | | |
| 22 | 15.2863 | 1.8000 | 1.593190 | 67.90 |
| 23 | −297.4796 | 0.8000 | 1.672700 | 32.19 |
| 24 | 41.2256 | D24 | | |
| 25 | ∞ | 0.2100 | 1.516800 | 63.88 |
| 26 | ∞ | 0.3900 | | |
| 27 | ∞ | 0.5000 | 1.516800 | 63.88 |
| 28 | ∞ | Bf | | |
| Image plane | ∞ | | | |

[Aspherical data]

Surface 15

κ = 0.0552, A4 = 3.82466E−05, A6 = 0.00000E+00,
A8 = 0.00000E+00, A10 = 0.00000E+00

Surface 16

κ = 1.0000, A4 = 6.09831E−05, A6 = −3.71841E−07,
A8 = 0.00000E+00, A10 = 0.00000E+00

[General Data] Zoom ratio 40.0000

| | Wide-angle end | Intermediate position 1 | Intermediate position 2 | Telephoto end |
|---|---|---|---|---|
| f | 4.40750 | 15.70000 | 47.60001 | 176.30548 |
| FNo | 2.93426 | 4.03058 | 4.87426 | 5.98056 |
| ω | 44.15413 | 14.40030 | 4.83385 | 1.29094 |
| Y | 7.00000 | 7.80000 | 7.80000 | 7.80000 |
| TL | 85.96880 | 94.70329 | 116.31449 | 133.86928 |
| Bf | 0.53000 | 0.53000 | 0.53000 | 0.52997 |
| Bf (Converted into air) | 1.38809 | 1.38810 | 1.38809 | 1.38808 |

[Zooming Data]

| Variable distance | Wide-angle end | Intermediate position 1 | Intermediate position 2 | Telephoto end |
|---|---|---|---|---|
| D5 | 0.89998 | 21.63034 | 43.30567 | 57.97751 |
| D13 | 34.12700 | 12.24012 | 5.46236 | 1.85000 |
| D21 | 7.83663 | 8.06163 | 6.24145 | 32.61629 |
| D24 | 4.72518 | 14.39121 | 22.92500 | 3.04552 |

TABLE 3-continued

[Zoom Lens Group Data]

| Group number | First surface of group | Group focal length | Lens configuration Length |
|---|---|---|---|
| G1 | 1 | 77.85366 | 11.80 |
| G2 | 6 | −8.10200 | 12.60 |
| G3 | 15 | 16.82676 | 9.75 |
| G4 | 22 | 43.01372 | 2.60 |

[Conditional Expression]

| Conditional expression (1) | vdp1 = 95.0 |
|---|---|
| Conditional expression (2) | vdp2 = 82.57 |
| Conditional expression (3) | (−fG2)/fG1 = 0.104 |
| Conditional expression (4) | vdn1/vdp1 = 0.371 |

As the data in Table 3 shows, the zoom lens ZL3 according to this example satisfies all of the conditional expressions (1) to (4).

Figure 8A:
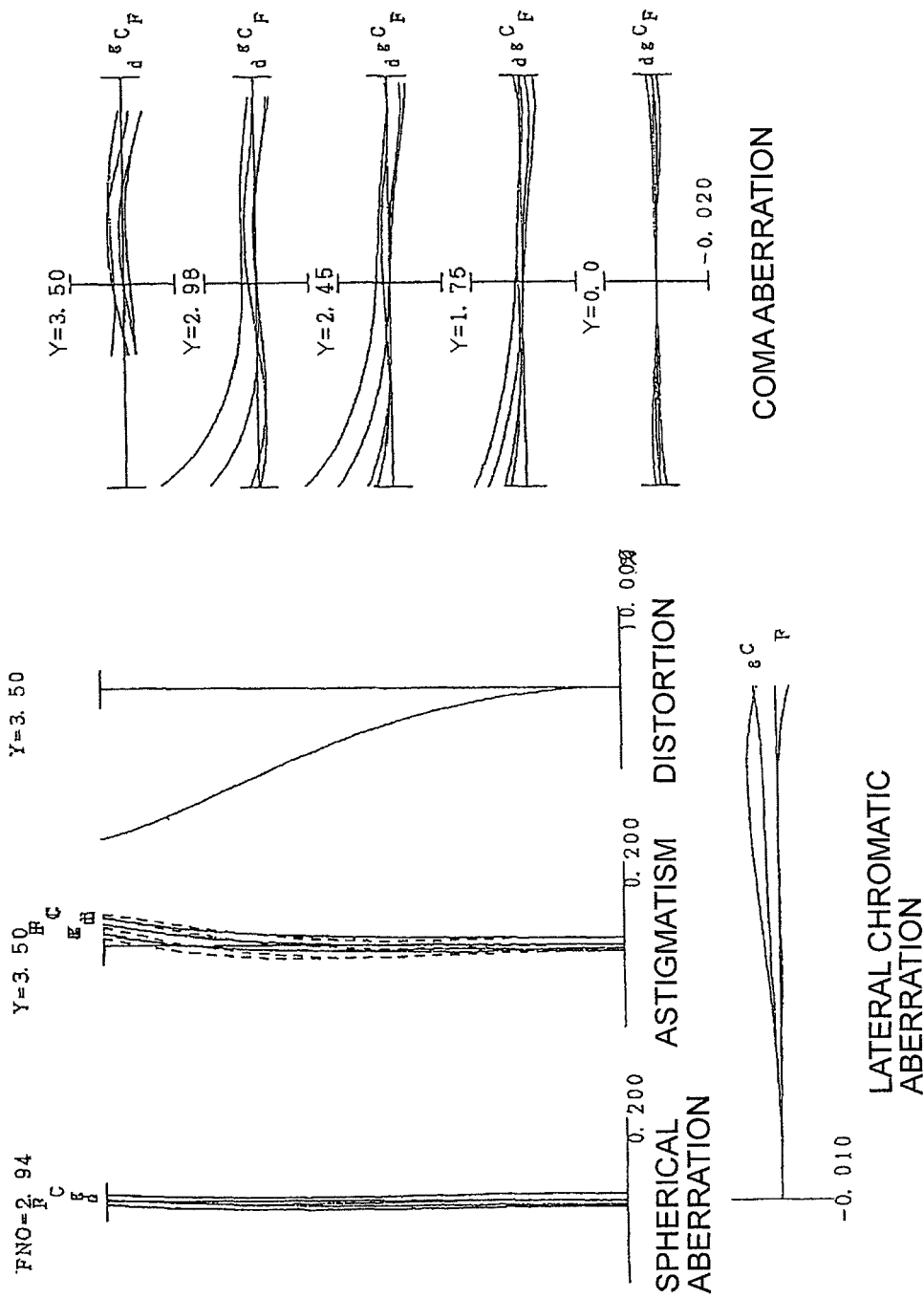
FIG. 8A and FIG. 8B are graphs showing various aberrations of the zoom lens according to Example 3, where FIG. 8A are graphs showing various aberrations of the zoom lens upon focusing on infinity in the wide-angle end state, and FIG. 8B are graphs showing various aberrations of the zoom lens upon focusing on infinity in the intermediate focal length state on the wide-angle end side.
Figure 8B:
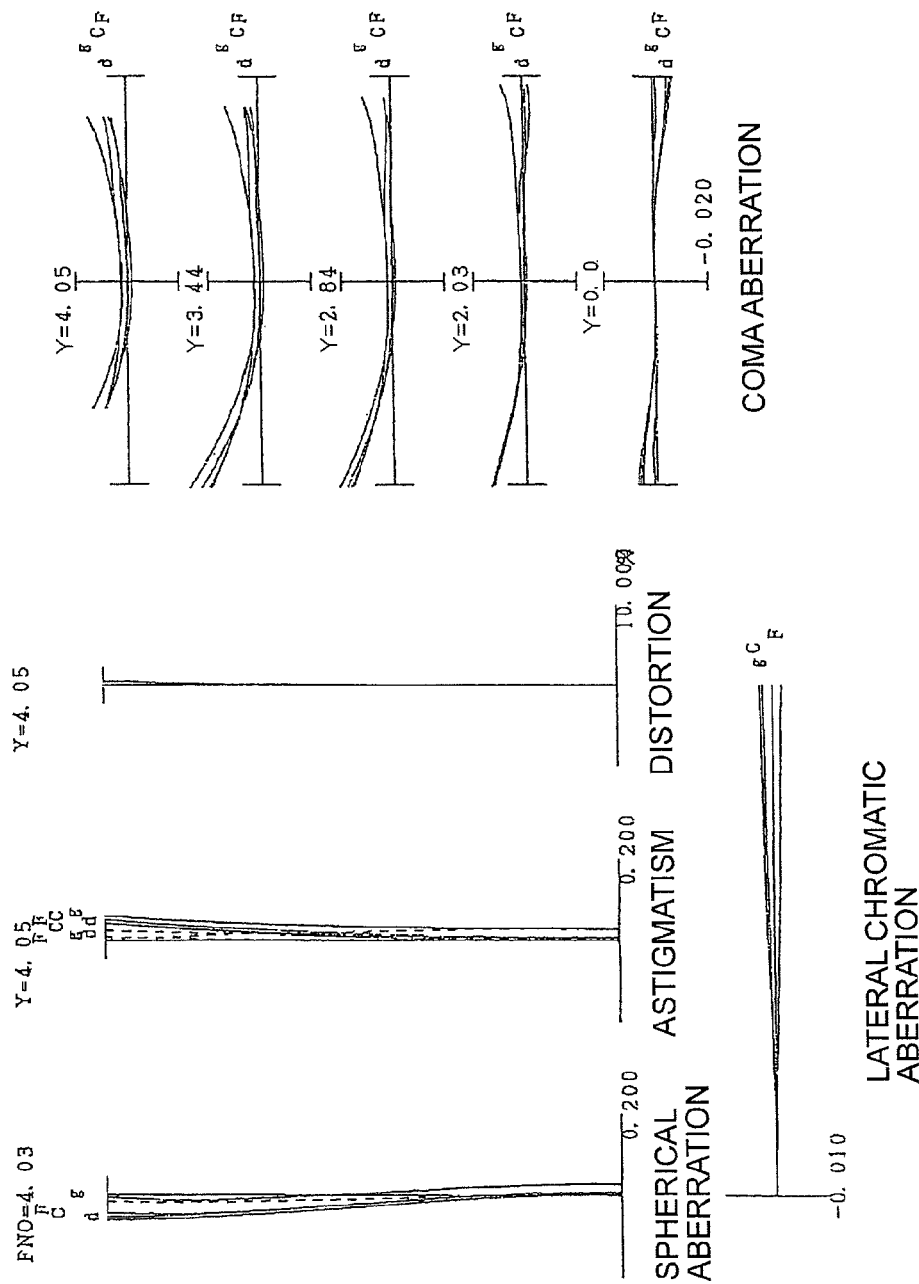
Figure 9B:
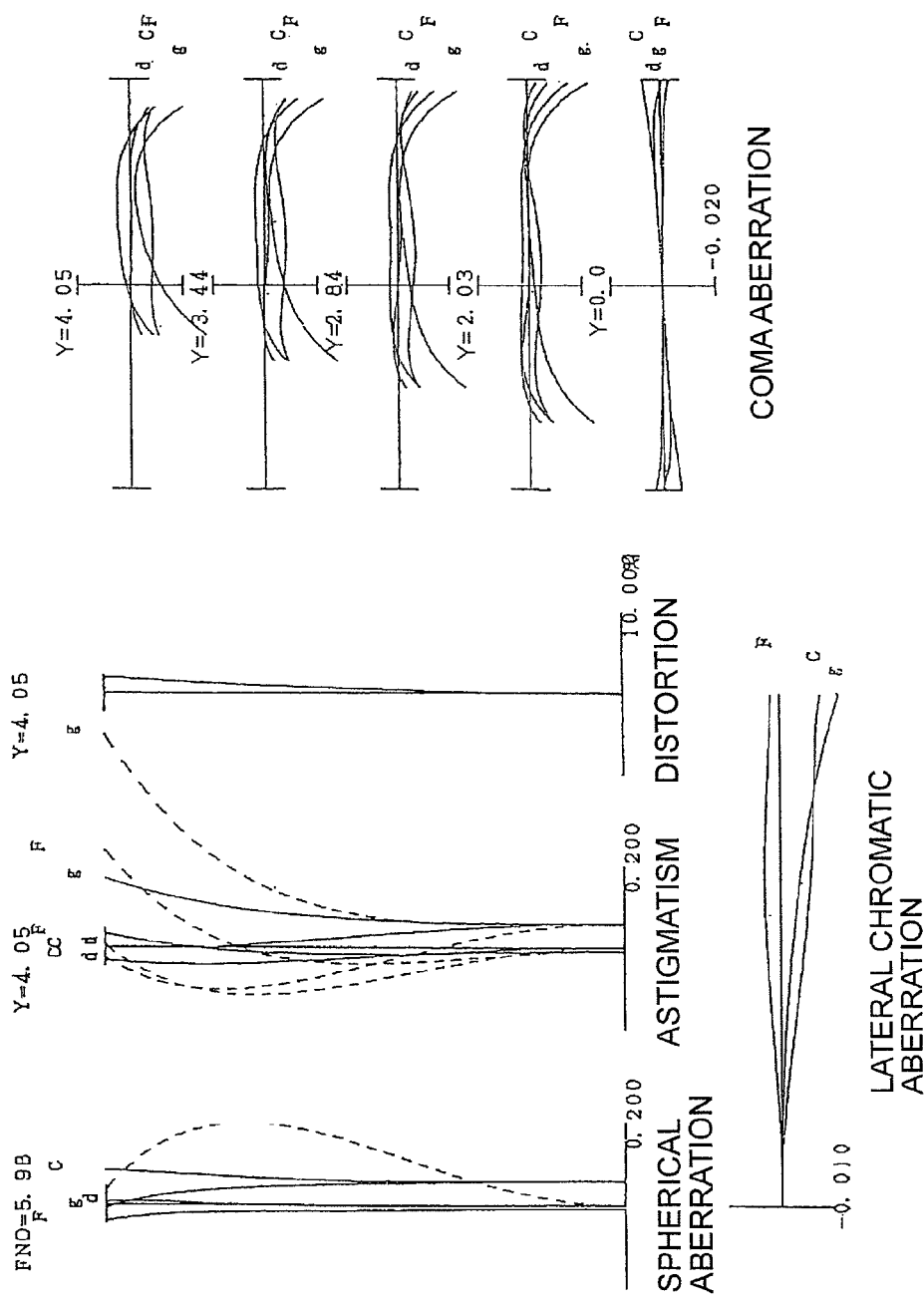

FIG. 8 and FIG. 9 are graphs showing various aberrations of the zoom lens ZL3 according to Example 3. FIG. 8A are graphs showing various aberrations of the zoom lens upon focusing on infinity in the wide-angle end state, FIG. 8B are graphs showing various aberrations of the zoom lens upon focusing on infinity in the intermediate focal length state on the wide-angle end side (intermediate position 1), FIG. 9A are graphs showing various aberrations of the zoom lens upon focusing on infinity in the intermediate focal length state on the telephoto end side (intermediate position 2), and FIG. 9B are graphs showing various aberrations of the zoom lens upon focusing on infinity in the telephoto end state.

As each graph showing aberrations clarifies, the zoom lens according to Example 3 has an excellent image forming performance, where various aberrations are ideally corrected in each focal length state from the wide-angle end state to the telephoto end state.

Example 4

Example 4 will now be described with reference to FIG. 10 to FIG. 12 and Table 4. FIG. 10 shows a configuration of a zoom lens ZL (ZL4) according to Example 4 and a zoom locus from the wide-angle end state (W) to the telephoto end state (T). As illustrated in FIG. 10, the zoom lens ZL4 according to Example 4 includes, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 includes, in order from the object, a cemented lens of a negative meniscus lens L11 having a convex surface facing the object and a biconvex positive lens L12, and a positive meniscus lens L13 having a convex surface facing the object.

The second lens group G2 includes, in order from the object, a negative meniscus lens L21 having a convex surface facing the object, a biconcave negative lens L22, a biconvex positive lens L23, and a biconcave negative lens L24.

The third lens group G3 includes, in order from the object, a biconvex positive lens L31, a cemented lens of a positive meniscus lens L32 having a convex surface facing the object and a negative meniscus lens L33 having a convex surface facing the object, and a biconvex positive lens L34.

The fourth lens group G4 includes a cemented lens of a biconvex positive lens L41 and a biconcave negative lens L42.

Between the fourth lens group G4 and the image plane I, a glass block GB, such as a low-pass filter and an infrared cut-off filter, is disposed for cutting off a spatial frequency not less than a critical resolution of a solid-state image sensor C (e.g. CCD, CMOS) disposed on the image plane I.

In the zoom lens ZL4 having this configuration, all of the four groups G1 to G4 move upon zooming from the wide-angle end state to the telephoto end state. In this case, the first lens group G1 moves toward the image plane once, and then moves toward the object. The second lens group G2 moves toward the image plane once, and then moves toward the object. The third lens group G3 moves toward the object. The fourth lens group G4 moves toward the object once, and then moves toward the image plane. The aperture stop S for determining brightness moves together with the third lens group G3 toward the object upon zooming.

Table 4 shows each data value of Example 4. The surface numbers 1 to 28 in Table 4 correspond to each optical surface with radius of curvatures P1 to R28 in FIG. 10. In Example 4, surface 15 and surface 16 are formed to be aspherical.

TABLE 4

[Lens Data]

| Surface number | R | D | nd | vd |
|---|---|---|---|---|
| Object surface | ∞ | | | |
| 1 | 76.7886 | 1.8000 | 1.910822 | 35.25 |
| 2 | 47.9026 | 6.0000 | 1.435000 | 95.00 |
| 3 | −225.7879 | 0.2000 | | |
| 4 | 42.9180 | 3.8000 | 1.497820 | 82.57 |
| 5 | 188.7852 | D5 | | |
| 6 | 276.0607 | 1.1000 | 1.902650 | 35.73 |
| 7 | 8.5480 | 4.3500 | | |
| 8 | −37.4926 | 0.9000 | 1.788000 | 47.35 |
| 9 | 31.6923 | 0.2000 | | |
| 10 | 15.1743 | 4.6000 | 1.805180 | 25.45 |
| 11 | −18.6426 | 0.6000 | | |
| 12 | −15.3527 | 0.8000 | 1.772500 | 49.62 |
| 13 | 65.8528 | D13 | | |
| 14 (Aperture stop) | ∞ | 0.7500 | | |
| *15 (Aspherical surface) | 9.4375 | 2.5000 | 1.592014 | 67.02 |
| *16 (Aspherical surface) | −46.9864 | 0.2000 | | |
| 17 | 9.6434 | 2.3000 | 1.497820 | 82.57 |
| 18 | 415.9130 | 1.5000 | 1.834000 | 37.18 |
| 19 | 6.9904 | 1.1000 | | |
| 20 | 152.5075 | 1.5000 | 1.593190 | 67.90 |
| 21 | −27.9357 | D21 | | |
| 22 | 16.3477 | 1.8000 | 1.589130 | 61.22 |
| 23 | −165.1591 | 0.8000 | 1.805180 | 25.45 |
| 24 | 65.9246 | D24 | | |
| 25 | ∞ | 0.2100 | 1.516800 | 63.88 |
| 26 | ∞ | 0.3900 | | |
| 27 | ∞ | 0.5000 | 1.516800 | 63.88 |
| 28 | ∞ | Bf | | |
| Image plane | ∞ | | | |

[Aspherical data]

Surface 15

κ = −0.2070, A4 = 8.34557E−05, A6 = −6.60636E−07,
A8 = 0.00000E+00, A10 = 0.00000E+00

Surface 16

κ = 1.0000, A4 = 5.19910E−05, A6 = −1.04824E−06,
A8 = 0.00000E+00, A10 = 0.00000E+00

TABLE 4-continued

[General Data] Zoom ratio 40.0000

|  | Wide-angle end | Intermediate position 1 | Intermediate position 2 | Telephoto end |
|---|---|---|---|---|
| f | 4.40750 | 15.70000 | 47.60001 | 176.30006 |
| FNo | 2.90220 | 3.95956 | 4.76169 | 6.05590 |
| ω | 44.15356 | 14.39569 | 4.83259 | 1.29103 |
| Y | 7.00000 | 7.80000 | 7.80000 | 7.80000 |
| TL | 86.16422 | 94.86564 | 116.40708 | 135.54364 |
| Bf | 0.53000 | 0.53000 | 0.53000 | 0.52999 |
| Bf (Converted into air) | 1.38809 | 1.38810 | 1.38809 | 1.38808 |

[Zooming Data]

| Variable distance | Wide-angle end | Intermediate position 1 | Intermediate position 2 | Telephoto end |
|---|---|---|---|---|
| D5 | 0.90006 | 21.69447 | 43.46345 | 57.97992 |
| D13 | 34.05042 | 12.02500 | 5.16837 | 1.84999 |
| D21 | 7.56367 | 8.02355 | 6.19274 | 34.74809 |
| D24 | 5.72198 | 15.19451 | 23.65442 | 3.03756 |

[Zoom Lens Group Data]

| Group number | First surface of group | Group focal length | Lens configuration Length |
|---|---|---|---|
| G1 | 1 | 78.07027 | 11.80 |
| G2 | 6 | −8.17069 | 12.55 |
| G3 | 15 | 17.15961 | 9.35 |
| G4 | 22 | 43.00000 | 2.60 |

[Conditional Expression]

| Conditional expression (1) | νdp1 = 95.0 |
|---|---|
| Conditional expression (2) | νdp2 = 82.57 |
| Conditional expression (3) | (−fG2)/fG1 = 0.105 |
| Conditional expression (4) | νdn1/νdp1 = 0.371 |

As the data in Table 4 shows, the zoom lens ZL4 according to this example satisfies all of the conditional expressions (1) to (4).

Figure 11B:
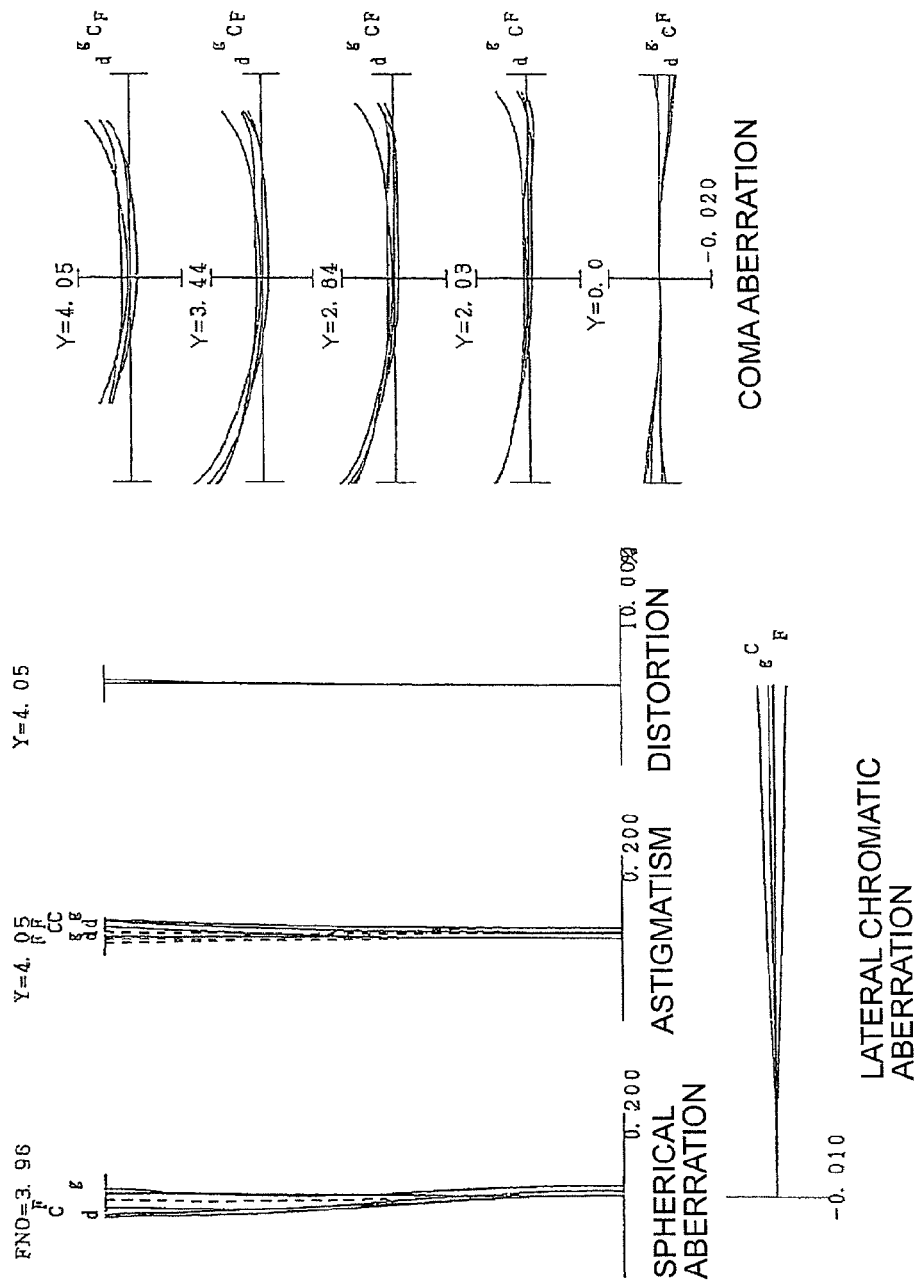
Figure 12A:
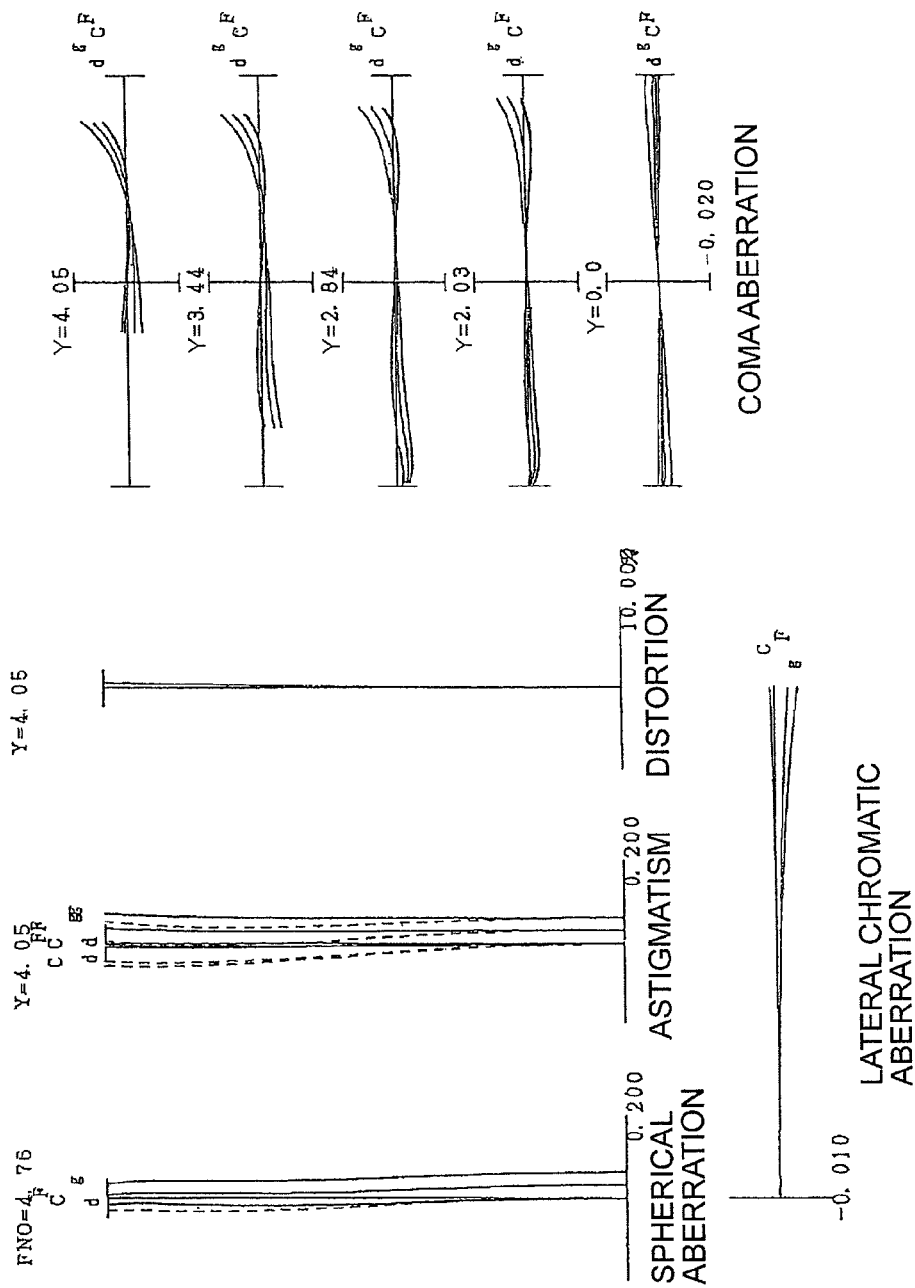

FIG. 11 and FIG. 12 are graphs showing various aberrations of the zoom lens ZL4 according to Example 4. FIG. 11A are graphs showing various aberrations of the zoom lens upon focusing on infinity in the wide-angle end state, FIG. 11B are graphs showing various aberrations of the zoom lens upon focusing on infinity in the intermediate focal length state on the wide-angle end side (intermediate position 1), FIG. 12A are graphs showing various aberrations of the zoom lens upon focusing on infinity in the intermediate focal length state on the telephoto end state (intermediate position 2), and FIG. 12B are graphs showing various aberrations of the zoom lens upon focusing on infinity in the telephoto end state.

As each graph showing aberrations clarifies, the zoom lens according to Example 4 has an excellent image forming performance, where various aberrations are ideally corrected in each focal length state from the wide-angle end state to the telephoto end state.

Although the embodiments were described with configuration requirements to clarify the present invention, the present invention is not limited to this.

EXPLANATION OF NUMERALS AND CHARACTERS

| ZL (ZL1 to ZL4) | zoom lens |
|---|---|
| G1 | first lens group |
| G2 | second lens group |
| G3 | third lens group |
| G4 | fourth lens group |
| S | aperture stop |
| GB | glass block |
| C | solid-state image sensor |
| I | image plane |
| CAM | digital still camera (optical apparatus) |

The invention claimed is:

1. A zoom lens comprising, in order from an object:
a first lens group having positive refractive power; a second lens group having negative refractive power; a third lens group having positive refractive power; and a fourth lens group having positive refractive power,
the first lens group including only, in order from the object, a cemented lens of a negative lens and a positive lens, and a positive meniscus lens having a convex surface facing the object,
an aperture stop for determining brightness being disposed to the object side of the third lens group,
all of the four groups moving and the aperture stop moving together with the third lens group upon zooming, and the following conditional expression being satisfied:

νdp1>85.0 where νdp1 denotes an Abbe number of the positive lens, which is disposed closest to the object in the first lens group, at the d-line as a standard, and
the fourth lens group includes only a cemented lens of a positive lens and a negative lens which are disposed in order from the object.

2. The zoom lens according to claim 1, wherein
the second lens group moves toward an image plane once and then moves toward the object upon zooming.

3. The zoom lens according to claim 1, wherein
the following conditional expression is satisfied:

νdp2>60.0 where νdp2 denotes an Abbe number of the positive lens, which is disposed closest to the image plane in the first lens group, at the d-line as a standard.

4. The zoom lens according to claim 1, wherein
the second lens group includes only, in order from the object, a negative lens, a negative lens, a positive lens and a negative lens.

5. The zoom lens according to claim 1, wherein
the third lens group includes only, in order from the object, a positive lens, a cemented lens of a positive lens and a negative lens, and a positive lens.

6. The zoom lens according to claim 1, wherein
the following conditional expression is satisfied:

0.05<(−fG2)/fG1<0.15 where fG1 denotes a focal length of the first lens group, and fG2 denotes a focal length of the second lens group.

7. The zoom lens according to claim 1, wherein
the following conditional expression is satisfied:

0.200<νdn1/νdp1<0.400 where νdn1 denotes an Abbe number of the negative lens, which is disposed closest to the object in the first lens group, at the d-line as a standard, and vdp1 denotes an Abbe number of the positive lens, which is disposed closest to the object in the first lens group, at the d-line as a standard.

8. The zoom lens according to claim 1, wherein
the fourth lens group moves toward the object once and then moves toward an image plane upon zooming.

9. The zoom lens according to claim 1, wherein
the third lens group includes at least one aspherical lens.

10. An optical apparatus comprising the zoom lens according to claim 1.

11. A method for manufacturing a zoom lens including, in order from an object, a first lens group having positive refractive power, a second lens group having negative refractive power, a third lens group having positive refractive power and a fourth lens group having positive refractive power, the method comprising:

installing each lens in a lens barrel so that
the first lens group includes only, in order from the object,
a cemented lens of a negative lens and a positive lens, and a positive meniscus lens having a convex surface facing the object,
an aperture stop for determining brightness is disposed to the object side of the third lens group,
all of the four groups move and the aperture stop moves together with the third lens group upon zooming, and
the following conditional expression is satisfied:

$$vdp1 > 85.0$$

where vdp1 denotes an Abbe number of the positive lens, which is disposed closest to the object in the first lens group, at the d-line as a standard, and
the fourth lens group includes only a cemented lens of a positive lens and a negative lens which are disposed in order from the object.

* * * * *